(12) United States Patent
Chen et al.

(10) Patent No.: US 7,078,855 B2
(45) Date of Patent: *Jul. 18, 2006

(54) DIELECTRIC LIGHT DEVICE

(76) Inventors: Zhizhang Chen, 4411 Snowbrush Dr., Corvallis, OR (US) 97330; Sriram Ramamoorthi, 5062 SW. Technology Loop, #93, Corvallis, OR (US) 97333; Terry E McMahon, 631 NW. 10th St., Corvallis, OR (US) 97330; Timothy F. Myers, 30862 Peterson Rd., Philomath, OR (US) 97370

(*) Notice: Subject to any disclaimer, the term of this patent is extended or adjusted under 35 U.S.C. 154(b) by 179 days.

This patent is subject to a terminal disclaimer.

(21) Appl. No.: 11/035,806

(22) Filed: Jan. 12, 2005

(65) Prior Publication Data
US 2005/0122033 A1  Jun. 9, 2005

Related U.S. Application Data

(60) Division of application No. 10/337,685, filed on Jan. 6, 2003, now Pat. No. 6,882,100, which is a continuation-in-part of application No. 09/846,127, filed on Apr. 30, 2001, now Pat. No. 6,781,146.

(51) Int. Cl.
 *H01L 29/02* (2006.01)
 *H01J 1/30* (2006.01)
(52) U.S. Cl. ............ 313/498; 313/499; 313/308; 313/310; 313/336; 257/9; 257/10; 257/11; 257/25; 257/37; 445/50
(58) Field of Classification Search ........ 313/309–311, 313/351, 336, 495–497, 498; 257/9–11; 445/24, 49–51
See application file for complete search history.

(56) References Cited

U.S. PATENT DOCUMENTS

| | | |
|---|---|---|
| 3,665,241 A | 5/1972 | Spindt et al. |
| 4,303,930 A | 12/1981 | Van Gorkom et al. |
| 4,516,146 A | 5/1985 | Shannon et al. |
| 5,090,932 A | 2/1992 | Dieumegard et al. |
| 5,414,272 A | 5/1995 | Watanabe et al. |
| 5,473,218 A | 12/1995 | Moyer |
| 5,489,817 A | 2/1996 | Muller et al. |
| 5,554,859 A | 9/1996 | Tsukamoto et al. |
| 5,557,596 A | 9/1996 | Gibson et al. |
| 5,559,342 A | 9/1996 | Tsukamoto et al. |
| 5,702,281 A | 12/1997 | Huang et al. |
| 5,703,380 A | 12/1997 | Potter |
| 5,705,284 A | 1/1998 | Hosakawa et al. |
| 5,760,417 A | 6/1998 | Watanabe et al. |
| 5,814,832 A | 9/1998 | Takeda et al. |
| 5,825,049 A | 10/1998 | Simmons et al. |

(Continued)

OTHER PUBLICATIONS

"Increasing Emission Current From MIM Cathodes by Using An Ir-Pt-Au Multilayer Top Electrode"; 2000 IEEE Transactions On Electron Devices; vol. 47, No. 8; by: Toshiaki Kusunoki, et al; 6 pgs.

(Continued)

*Primary Examiner*—Karabi Guharay
*Assistant Examiner*—Sikha Roy
(74) *Attorney, Agent, or Firm*—Timothy F. Myers

(57) ABSTRACT

A light device includes an electron supply defining an emitter surface. A dielectric tunneling layer is disposed between the electron supply and a cathode layer. The cathode layer has at least partial photon transparency that is substantially uniform across the emitter surface.

36 Claims, 18 Drawing Sheets

U.S. PATENT DOCUMENTS

| | | |
|---|---|---|
| 5,932,966 A | 8/1999 | Schneider et al. |
| 5,982,091 A | 11/1999 | Konishi |
| 6,008,576 A | 12/1999 | Nakatani et al. |
| 6,011,356 A | 1/2000 | Janning et al. |
| 6,023,124 A | 2/2000 | Chuman et al. |
| 6,034,479 A | 3/2000 | Xia |
| 6,096,570 A | 8/2000 | Hattori |
| 6,107,732 A | 8/2000 | Tolt |
| 6,118,136 A | 9/2000 | Liu et al. |
| 6,137,212 A | 10/2000 | Liu et al. |
| 6,353,286 B1 | 3/2002 | Talin et al. |
| 6,369,496 B1 | 4/2002 | Yoshiki |
| 6,538,256 B1 | 3/2003 | Mankos et al. |

OTHER PUBLICATIONS

"Injection Electroluminescence in Metal-Semiconductor Tunnel Diodes"; Solid-State Electronics: Pergamon Press 1964; vol. 7: by: P.C. Eastman el al; pp. 879-885.

75A of Au on oxide

DIELECTRIC LIGHT DEVICE

CROSS REFERENCE TO RELATED APPLICATIONS

This Application is a divisional of commonly assigned U.S. patent application Ser. No. 10/337,685, now U.S. Pat. No. 6,882,100, filed Jan. 6, 2003, which is hereby incorporated by reference, which is a continuation-in-part of commonly assigned U.S. patent application Ser. No. 09/846,127, now U.S. Pat. No. 6,781,146, filed Apr. 30, 2001, which is hereby incorporated by reference.

BACKGROUND

Most semiconductor light emitting devices are fabricated using expensive compound semiconductors such as gallium arsenide and indium phosphide. Compound semiconductors tend to be expensive, difficult to manufacture, brittle and difficult to integrate with conventional silicon semiconductor devices due to crystal lattice mismatches. Researchers have for years attempted to create light on silicon substrates but have been unable to do so. One recent approach has been to add a layer of material between silicon substrate and the compound semiconductor material to resolve the crystalline mismatch silicon and compound material. This approach is still expensive and requires the deposition and use of a compound semiconductor material. While allowing for the integration of logic and light emitting components, this approach is difficult to fabricate. Therefore a need continues to exist for a high speed, light emitting device that can be cheaply and easily fabricated on a silicon or even less expensive substrates.

SUMMARY

A light device includes an electron supply defining an emitter surface. A dielectric tunneling layer is disposed between the electron supply and a cathode layer. The cathode layer has at least partial photon transparency that is substantially uniform across the emitter surface.

BRIEF DESCRIPTION OF THE DRAWINGS

The light device is better understood with reference to the following drawings. The elements of the drawings are not necessarily to scale relative to each other. Rather, emphasis has instead been placed upon clearly illustrating the light device. Furthermore, like reference numerals designate corresponding similar parts through the several views.

DETAILED DESCRIPTION

Figure 1:
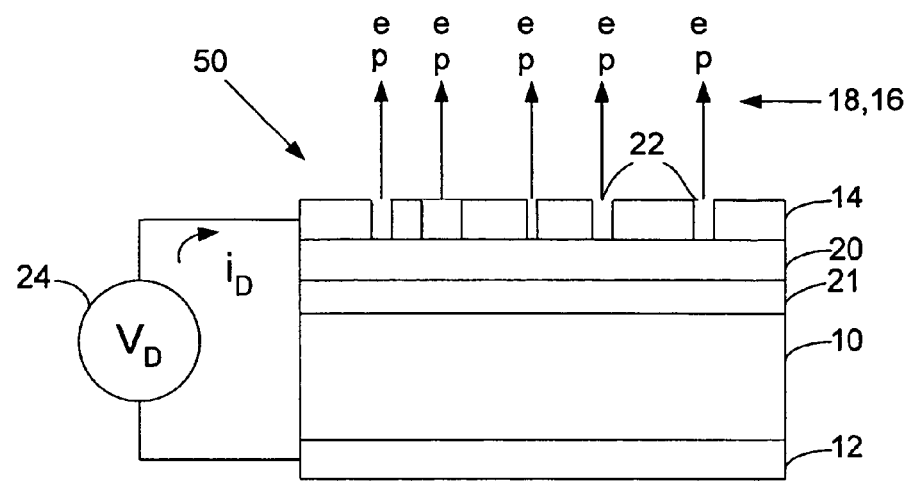
FIG. 1 is an exemplary illustration of a dielectric light emitter embodiment of the light device.

The present disclosure is directed to light devices such as tunneling emission emitters and photodetectors that provide high levels of photonic emission current density by using an electron tunneling layer with a sufficient thinness of less than about 500 Angstroms to create a high electric field between an electron source and a flat cathode surface. Photons are created when electrons tunnel through the tunneling layer and transition from a conductive to a valence band state.

Photon emission occurs by using at least a partially transparent material for the cathode surface. The at least partially transparent material also allows for external photons to be captured and create a current detectable through the tunneling layer.

Conventional flat emitter type devices have low electron emission current per square centimeter of surface area (i.e. less than 0.001 mA/cm$^2$) and thus are unable to create many photons. Further, those photons that are created from tunneled electrons are adsorbed or captured into the cathode surface.

The embodiments disclosed use a thin deposition of a high field strength dielectric such as a $TiO_x$ or silicon rich $Si_xN_y$ for the tunneling layer. Other possible dielectrics include $TiO_xN_y$ and $TiCO_xN_y$. The tunneling layer has a thickness of less than 500 Angstroms, such as between 50 and 250 Angstroms and for instance, around about 100 Angstroms, to create a barrier in which electrons can tunnel between the electron source and the cathode surface. By using such a dielectric material for the tunneling layer, the electron tunneling current can be greater than 10 mAmps, 100 mAmps, or even more than 1 Amp per square centimeter which is one, two, or almost three orders of magnitude, respectively, greater than that of conventional flat electron emitter technology. This high electron density allows for a large amount of transitions from the conductive to the valence band states thereby creating photons. The actual photon emission rate will depend upon the design choices of the type, construction, and thickness of material used for the tunneling layer and the cathode layer.

The wavelength and intensity of the emitted light is dependent on the applied electric field across the emitter. The dielectric light emitter utilizes a fundamental different physics than conventional light emitting devices. The dielectric light emitter provides a much simpler structure and less fabrication complexity than conventional devices resulting in much lower manufacturing costs. Additionally, the dielectric light emitter is compatible with existing semiconductor fabrication processes and equipment allowing for its incorporation on existing semiconductor integrated circuits. Because of this ease of integration, the dielectric light emitter is usable in several applications, new and old.

The increased photon emission is also made possible by the use of a porous cathode layer that has nanohole-sized openings or a transparent (which includes semi-transparent materials) conductive cathode layer.

By having nanohole-sized openings in the cathode layer, photons created by electron energy state transitions are allowed to escape through the openings. Preferably, the nanohole-sized openings have at least one dimension less than 10% of the thickness of the tunneling layer. With such small nanohole-sized openings, the electric field across the surface of the emitter is remains high and substantially uniform even across the openings. One method of creating the nanohole-sized openings is to subject the emitter to an annealing process in a nitrogen-containing environment for platinum cathode layers. Some cathode materials such as gold, are generally insensitive to the atmosphere environment used. During the annealing process, the cathode layer changes its morphology as the openings are created. The nanoholes provide for photonic and electron emission sites uniformly across the surface of the emitter on average, although the spacing and size of the nanoholes may be randomly made.

The nanoholes provide additional benefits in addition to the increased photon and electron emission current density. The nanoholes help prevent breakdown damage of the cathode thin metal layer when there is to non-uniformity of the electric field due to surface defects in the deposited thin film materials. The nanoholes also reduce electron emission spiking by allowing electrons with different momentums to escape through the openings. These benefits result in longer life, higher reliability, and more predictable operation over emitters that do not have nanohole-sized openings. The nanohole-sized openings are preferably sized in terms of length and width or diameter of less than about 500 nanometers such as between about 1 and about 10 nanometers for the narrowest dimension of the opening, and preferably between about 10 to about 100 nanometers for the longest dimension such as with a crack or fissure opening. The nanohole openings preferably are less than 10% of the tunneling dielectric thickness to maintain a substantially uniform electric field across the opening and surface of the emitter. The distribution of the nanoholes is preferably uniform across the surface of the emitting surface (at least on average) and spaced sufficiently so that the cathode layer maintains a discontinuous but contiguous electrical connection over the surface of the emitter. The nanoholes can be of a uniform size or randomly distributed in size. The spacing of the nanoholes may be uniformly or randomly spaced but on average should be distributed uniformly across the surface of the emission surface to prevent localized concentration of emissions that may damage the emitter.

An additional benefit of the annealing process used to create the nanoholes is that the tunneling resistance of the tunnel layer is reduced by at least a factor of 2 and preferably more. Also, the annealing process decreases the contact resistance of the thin-film interfaces. This decrease in tunneling and contact resistance allows for more electrons to tunnel across the barrier for a given voltage across the emitter thereby allowing for more state transitions to create photons. This tunneling resistance along with the nanohole openings result in an electron emitter having an electron emission efficiency of greater than 1%.

When using a substantially transparent (or semitransparent including transparent to select frequencies) conductive material for the cathode layer, photons that are created by electron state transitions are allowed to escape. The thickness of the transparent conductive material is preferably deposited thick enough to prevent the electrons that have tunneled to not escape and be emitted from the cathode surface. This reduces the need for an additional electron capture device such as an anode. Further, the transparent conductive material provides for a substantially uniform electric field across the emitter to further provide for substantially uniform emissions of photons from the dielectric light emitter. Optionally, the transparent conductive layer can be deposited on a cathode layer with nanohole openings to provide a uniform electric field with a higher conductive metal layer, and to provide for electron capture.

Further advantages and features of the light device will become more apparent in the following description of several embodiments of the light device, its method of making and various applications of use.

In the illustrations of this description, various parts of the light device elements have not been drawn to scale. Certain dimensions have been exaggerated in relation to other dimensions in order to provide a clearer illustration and understanding of the present light devices. For the purposes of illustration, the embodiments illustrated herein are shown in two-dimensional views with various regions having depth and width. It should be understood that these region are illustrations only of a portion of a single cell of a device, which may include a plurality of such cells arranged in a three-dimensional structure. Accordingly, these regions will have three dimensions, including length, width, and depth when fabricated on an actual device.

Further, one aspect of the light device is that it can be fabricated using conventional integrated circuit thin-film technologies. Several different technologies and equipment exist to perform several of the process steps and can be interchanged by those having skill in the art. For example, unless specifically called out, deposition of material can be by one of several processes such as evaporation, sputtering, chemical vapor deposition, molecular beam epitaxy, photochemical vapor deposition, low temperature photochemical vapor deposition, and plasma deposition, to name a few. Additionally, several different etch technologies exist such as wet etching, dry etching, ion beam etching, reactive ion etching, and plasma etching such as barrel plasma etching and planar plasma etching to name some of the possible etching technologies. Choice of actual technologies used will depend on material used and cost criteria among other design decision factors.

FIG. 1 is an exemplary diagram of a light device in the form of a dielectric light emitter 50, a flat emitter for photon and electron emission, which includes an electron source 10. On the electron source 10 is disposed an optional ballast layer 21 and a tunneling layer 20. Optionally the ballast layer 21 and the tunneling layer 20 may be combined into a single layer. The purpose of the ballast layer 21 is to provide for uniform photon 18 and electron 16 emissions over the surface of the emitter by balancing the voltage applied across the tunneling layer 20. One example of a ballast layer is granular amorphous polysilicon that has an asymmetric sheet resistance with the least resistance in the direction of the thickness of the material (orthogonal to the plane of the layer). Several different materials and processes for creating ballast layers exist such as described in commonly assigned U.S. patent application Ser. No. 10/066,158, filed Jan. 31, 2002 and entitled "EMITTER AND METHOD OF MAKING," which is incorporated herein by reference. Preferably, the tunneling layer 20 is formed from a high dielectric strength dielectric material such as titanium oxide (TiO$_x$, where x=0.5 to 2.5), and silicon rich SiO$_x$N$_y$. Also, TiO$_x$N$_y$ and TiCOxNy are envisioned as being capable of use as tunneling layer 20 due to their having 3P–3S state transitions. The tunneling layer preferably has a thickness less than 500 Angstroms and more preferably the thickness is within the range of about 50 to about 250 Angstroms, such as about 100 Angstroms. The chosen thickness determines the electrical field strength that the tunneling layer must be able to withstand and affects the desired photon 18 and electron 16 emitter emission currents. Disposed on the tunneling layer 20 is a cathode layer 14, preferably a partially transparent, thin-film conductor such as platinum, gold or gold and tantalum with nanohole sized openings. Other possible conductors include molybdenum, iridium, ruthenium, tantalum, chromium, or other refractive metals or alloys thereof. Preferably, the thickness of the cathode layer is 30 to 150 Angstroms with about 50 to about 100 Angstroms more preferable. Preferably, the nanohole openings 22 are less than 500 nanometers (nm) such as on the order of about 1 to about 10 nanometers in at least one dimension and within the range of about 10 to about 100 nanometers in the longest dimension with cracks and fissures. These nanohole openings 22 help create photon and electron emission sites.

Optionally, the cathode layer can be fabricated using a deposited transparent conductive material such as InSnO$_x$ that allows the photon emission 18 to escape and optionally, but preferably not allow electron emission 16 to escape. Other transparent or partially transparent conductors such as ZnO$_x$, SnO$_2$, In$_2$O$_3$:Sn, to name a few, are known to those of skill in the art.

When a voltage source 24 having an emitter voltage V$_D$ (about 3–30V) is applied to the cathode layer 14 and electron supply 10 via a contact 12, electrons tunnel from the electron supply 10 to the cathode layer 14. Some of electrons transition between conduction and valence band states within the tunneling layer and the cathode layer thereby creating photons. Because of the nanohole-sized openings 22 within the tunneling layer 20, the electric field in which the electrons tunnel through is very strong and substantially uniform over the surface of the emitter allowing for the electron emission 16 and photon emission 18 from the surface of the cathode layer 14 to be greater than with conventional designs. The nanohole openings 22 allow the electrons that tunnel through the tunneling layer to exit from the emitter without colliding into the cathode layer material and thereby preventing a loss of momentum that would keep the electrons from escaping the surface of the cathode layer 14. Additionally, the nanohole openings 22 allow photons that are created by tunneled electrons that transition states during tunneling in the tunneling or cathode layers to exit.

The electron field is calculated for various thicknesses as $$\vec{E} = \frac{V_D}{t_{thickness}}$$

where t$_{thickness}$ is the thickness of tunneling layer 20. For example, for a V$_D$=10V, the electric field is equal to 10$^7$ volts/meter for a 100 Angstrom thickness in the tunneling layer. The electric field strength will be affected minimally by the nanohole openings 22 as described in FIGS. 14 and 15 below if the nanohole openings 22 are a small percentage of the thickness of the dielectric layer. By using a transparent conductive cathode layer, alone or in combination with the nanohole cathode layer, the electric field across the emitter remains uniform.

Preferably, the tunneling layer 20 is uniformly deposited such as by sputtering, deposition, or thermally grown. For example, when using metal cluster dielectrics (such as TiO$_x$) as the tunneling layer, very high electric field strength can be applied between the electron source 10 and the cathode layer 14 to achieve higher emission, because the metal cluster dielectrics withstand much higher electrical field strength without electrical breakdown than other dielectrics. However, other dielectrics may be able to provide more uniform deposition thicknesses (such as silicon rich SiO$_x$N$_y$) or have less stress within the thin-film layer. Actual design choice of the dielectric will depend on the application and the desired photon and electron emission current density. The examples described within this specification are for reference only in showing the applicability of the light device to practical electronic devices and are not meant to limit the scope of the invention, which is defined by the claims and their equivalents.

Figure 2:
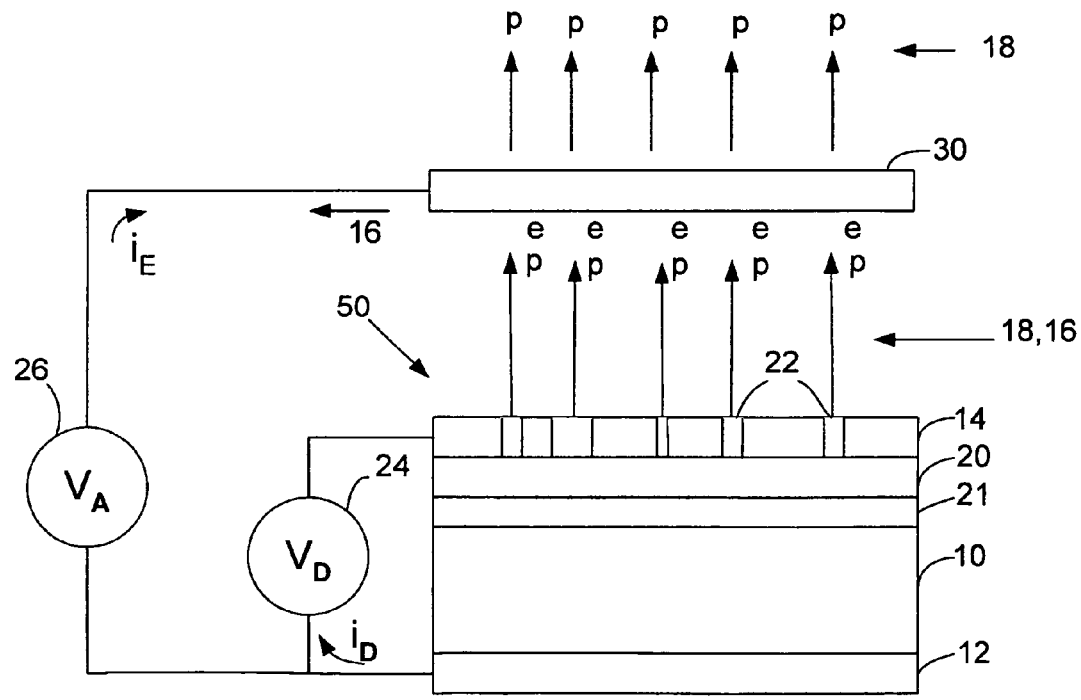
FIG. 2 is an exemplary illustration of the use of the dielectric light emitter of FIG. 1 to create a photonic beam without stray electrons.

FIG. 2 is an exemplary diagram of a use for the dielectric light emitter 50 of FIG. 1. In this application, the electron emission 16 is captured by anode 30, a transparent conductor such as InSnO$_x$ that allows the photon emission 18 to escape. Other transparent conductors such as ZnO$_x$, SnO$_2$, In$_2$O$_3$:Sn, to name a few, and can be substituted by those of skill in the art. Those skilled in the art will appreciate that anode structure 30 can be made from more than one transparent conductor layer to create a desired index of refraction to minimize reflections of photons. The anode structure 30 is set at an anode voltage $V_A$ 26 which magnitude varies for an application or test environment depending on the intended use and the distance from the anode structure 30 to the dielectric light emitter 50. For instance, with anode structure 30 being a recordable medium for a storage device, $V_A$ might be chosen to be between 500 and 1000 Volts. By being set at a proper voltage from $V_D$, the electrons 16 emitted from the nanohole openings 22 of the dielectric light emitter 50 are attracted to the anode structure 30 where they are captured.

Optionally, the anode structure 30 can be deposited on the nanohole cathode layer 14 and used to capture electrons after they have tunneled. In this exemplary embodiment, $V_A=V_D$.

The electron efficiency of the dielectric light dielectric light emitter 50 is the ratio of the emission current $i_E$ with respect to the current $i_D$ supplied to the dielectric light dielectric light emitter 50. The current shown is the conventional positive current flow. The negative current and thus electron flow is in the opposite direction. One advantage of the light device is that the electron emitter efficiency is increased due to the positive effects created by the nanohole openings 22, the decreased tunneling resistance of the tunneling layer, and the decreased inter-layer contact resistance. The electron emission efficiency of test models of the light device have reached about 1% without a ballast layer 21 and over about 7% when a ballast layer 21 is used. By having an increased emission current $i_E$, more electrons are available to transition from a conductive to a valence state, thereby creating more photons.

Figure 3A:
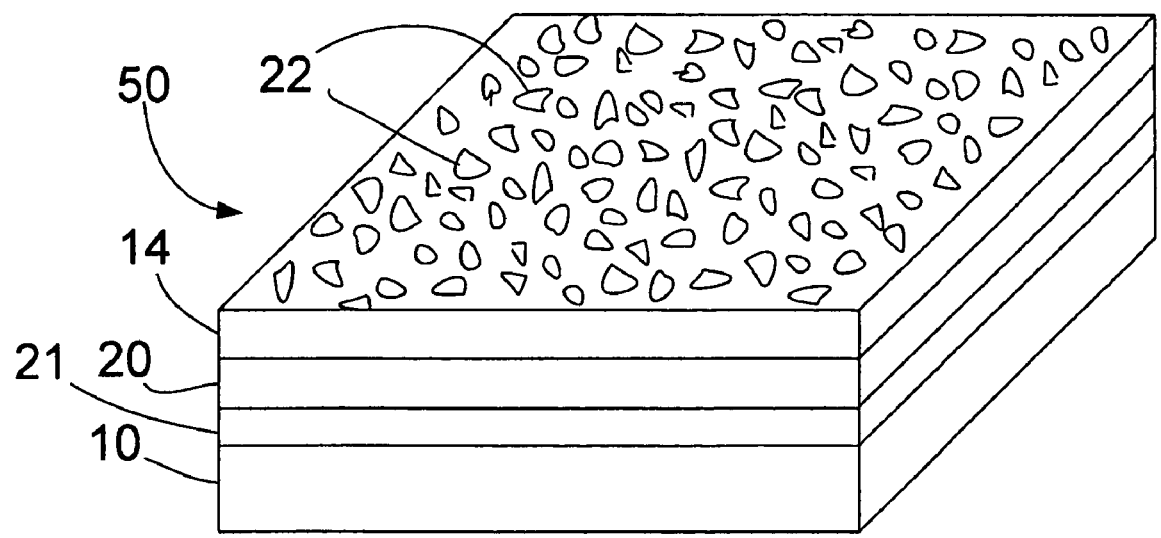
FIG. 3A is an exemplary perspective view of a dielectric light emitter with a cathode layer that includes nanohole openings in one embodiment of the light device.

FIG. 3A is an exemplary perspective view of a dielectric light emitter 50 that illustrates the nanohole-sized openings 22 within the surface of the cathode layer 14. The nanohole-sized openings 22 are substantially uniformly distributed on average over the surface of the emitter although the actual spacing between nanoholes may be random as well as the actual size of the nanoholes. The nanoholes are preferably sized less than 500 nanometers such as 1 to 400 nanometers and preferably about 1 to 10 nanometers in for the narrowest dimension or diameter and between about 10 and 100 nanometers in the longest dimension such as with cracks and fissures. Although using an annealing process forms the nanohole examples described within this specification, other methods of creating the nanoholes exist using sub-micron technology equipment such as by nanostamping. Nanostamping would allow nanoholes to be formed that are of a uniform size and uniformly spaced. Using the optional ballast layer 21 ensures that electrons and ultimately photons created by the electrons will be uniformly distributed to the nanoholes over the surface of the electron source and tunneling layer.

Figure 3B:
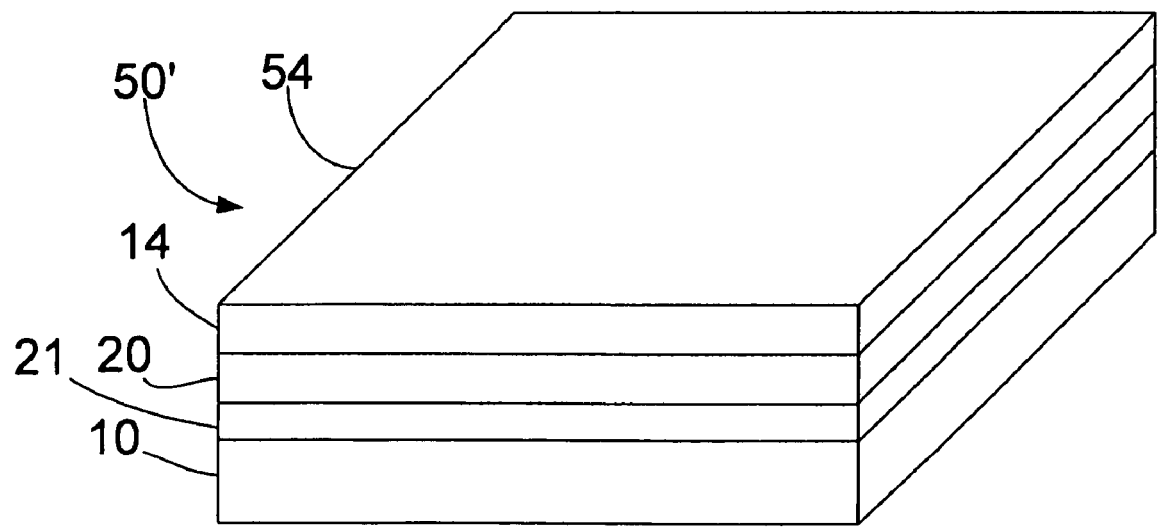
FIG. 3B is an exemplary perspective view of a dielectric light emitter with a transparent conductive cathode layer in an alternative embodiment of the light device.

FIG. 3B is an exemplary perspective view of a dielectric light emitter 50' that illustrates using a transparent conductor 54 for the surface of the cathode layer 14. Using the optional ballast layer 21 ensures that electrons and ultimately photons created by the electrons will be uniformly distributed to over the surface of the electron source and tunneling layer.

Figure 4:
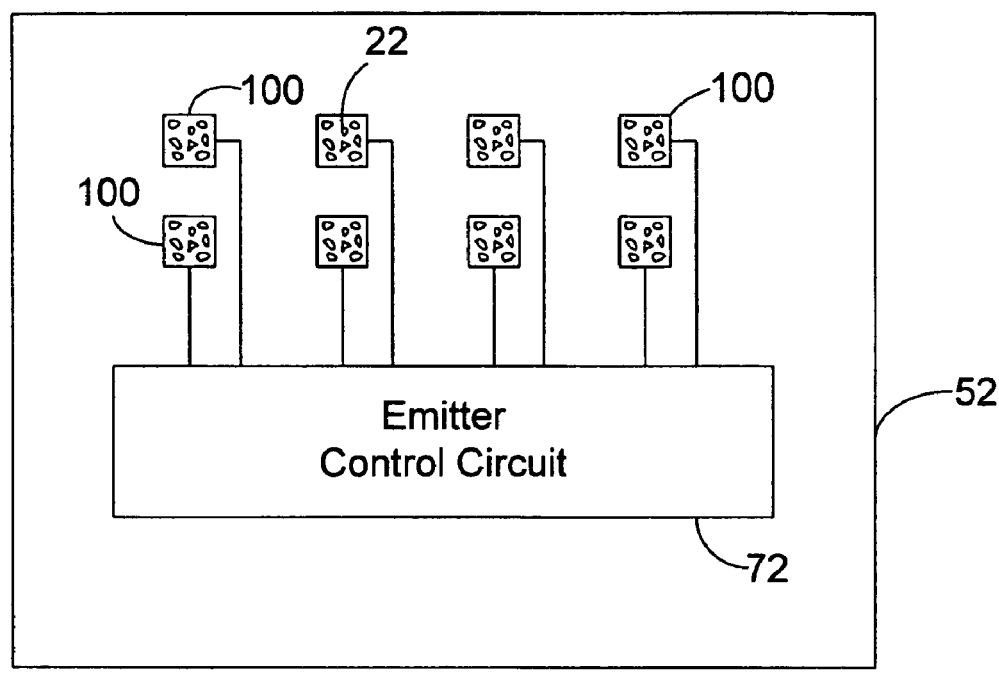
FIG. 4 is an exemplary block diagram of an embodiment of an integrated circuit that incorporates multiple dielectric light emitters and control circuitry.

FIG. 4 is an exemplary embodiment of an integrated circuit 52 that includes at least one integrated dielectric light emitter (DLE) 100 with nanohole openings 22 but preferably a plurality of integrated DLEs 100 organized in an array, such as for a display. An emitter control circuit 72 is integrated onto the integrated circuit 52 and used to operate the at least one integrated DLE 100. Because of the increased efficiency of the emitters due to the light device, less voltage needs to be applied to the emitters for a given current density. This lowering of the applied voltage allows the integrated DLEs 100 to be combined with conventional logic circuitry such as CMOS, NMOS, HVCMOS and BIMOS integrated circuit technology, to name a few.

Figure 5:
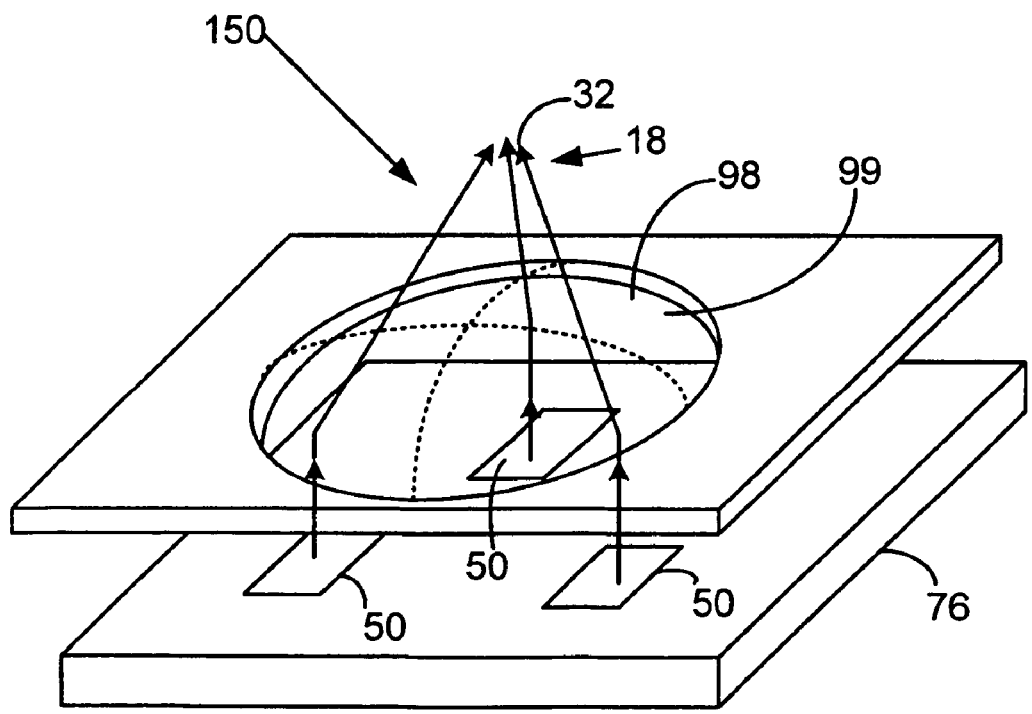
FIG. 5 is an exemplary embodiment of a dielectric light emitter on an integrated circuit that includes an optical lens for focusing the photonic emissions from the dielectric light emitter.

FIG. 5 is an exemplary embodiment of a use for the dielectric light emitter 50 in an optical display device 150. A substrate 76, such as silicon, glass, ceramic, or other appropriate material such as a flexible sheet, has the electron source 10, tunneling layer 20, preferably ballast layer 21 and an at least partially transparent cathode layer 14 disposed as shown in FIG. 1 to create multiple dielectric light emitters 50. The dielectric light emitters 50 are arranged preferably in a row/column fashion to create a visible display. An optical lens 98 is positioned above the display to focus the photons 18 into an image 32 viewable by a user. Optionally, the optical lens 98 is coated with a transparent conductive coating 99 (such as shown for anode structure 30 in FIG. 2) to capture any electrons emitted from the DLE 50. Optionally, the substrate 76 can be an integrated circuit 58 (FIG. 4) that includes control circuitry 72 (FIG. 4). The DLE 50 can be incorporated onto the integrated circuit to create integrated DLE's 100 (FIG. 4).

Figure 6:
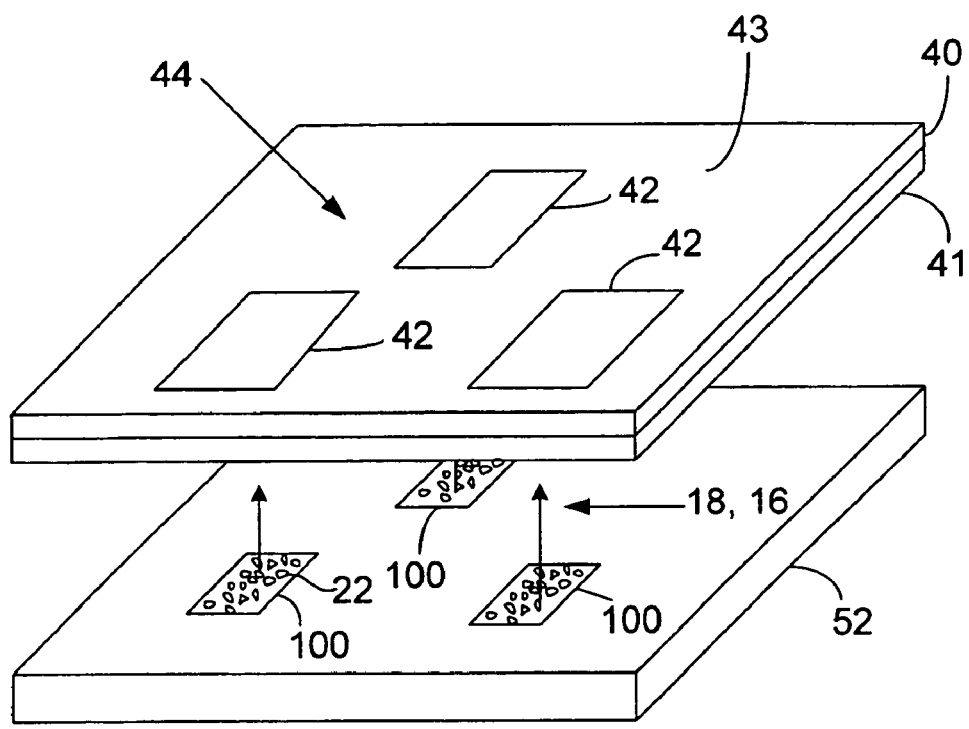
FIG. 6 is an alternative exemplary display embodiment that is created from an integrated circuit that includes multiple dielectric light emitters and an anode structure with a shadow mask.

FIG. 6 is an alternative embodiment of a display application using the integrated DLE 100 embodiment of the light device. In this embodiment, a plurality of integrated DLEs 100 is arraigned and formed in an integrated circuit 52. Each of the integrated DLEs 100 emits electron emissions 16 preferably from nanohole openings 22. An anode structure, display 40, receives the emitted energy in display pixel 44, made up of display sub-pixels 42. Display sub-pixel 42 is preferably an electrophosphorescent or other material that creates photons when struck by the electron emission 16. Display sub-pixels 42 may use different colors of phosphorescent material to create a color display. Optionally, a shadow mask 43 is used to increase contrast.

Optionally, rather than having sub-pixels 42 be made of phosphor material, the sub-pixels 42 can be transparent openings in which photons create by integrated DLE 100 are allowed to pass though to a user.

An electrode anode 41 can be used to accelerate electrons when using phosphors or to capture electrons when sub-pixel 42 is transparent.

Figure 7:
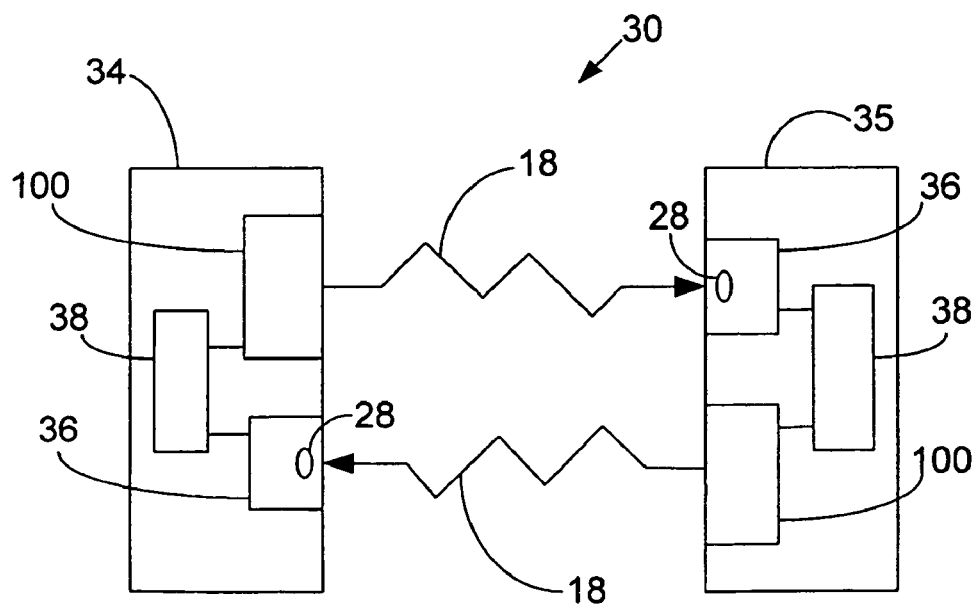
FIG. 7 is an exemplary embodiment of a communication system with transceivers that incorporate an integrated circuit that include a dielectric light device for sending and receiving information.

FIG. 7 is an exemplary embodiment of other uses for the integrated DLE 100 in a communication system 30. In this application, a first electronic device 34 has at least one integrated DLE 100 and a photodetector 36. One option for photodetector 36 is to use an integrated DLE 100 as a photon receiver (see discussion on FIGS. 19 and 20). Other types of conventional photodetectors known to those of skill in the art can be used. Optionally photodetector 36 may include an optical lens 28 for gathering or focusing photons onto its photon sensor. The integrated DLE 100 creates a photon emission 18 using one of several communications protocols known to those of skill in the art. The photon emission 18 is transmitted to a second electronic device 35, which also has at least one integrated DLE 100 and a photodetector 36. The photon emissions 18 are detected by photodetector 36 and converted to electrons that are used by communication control circuitry 38, which is also connected to integrated DLE 100.

For example, a computer system with a microprocessor is coupled to the first electronic device 34. The microprocessor has memory capable of executing instructions from the memory to transfer data between the memory and the electronic device using communication system 30.

Figure 8:
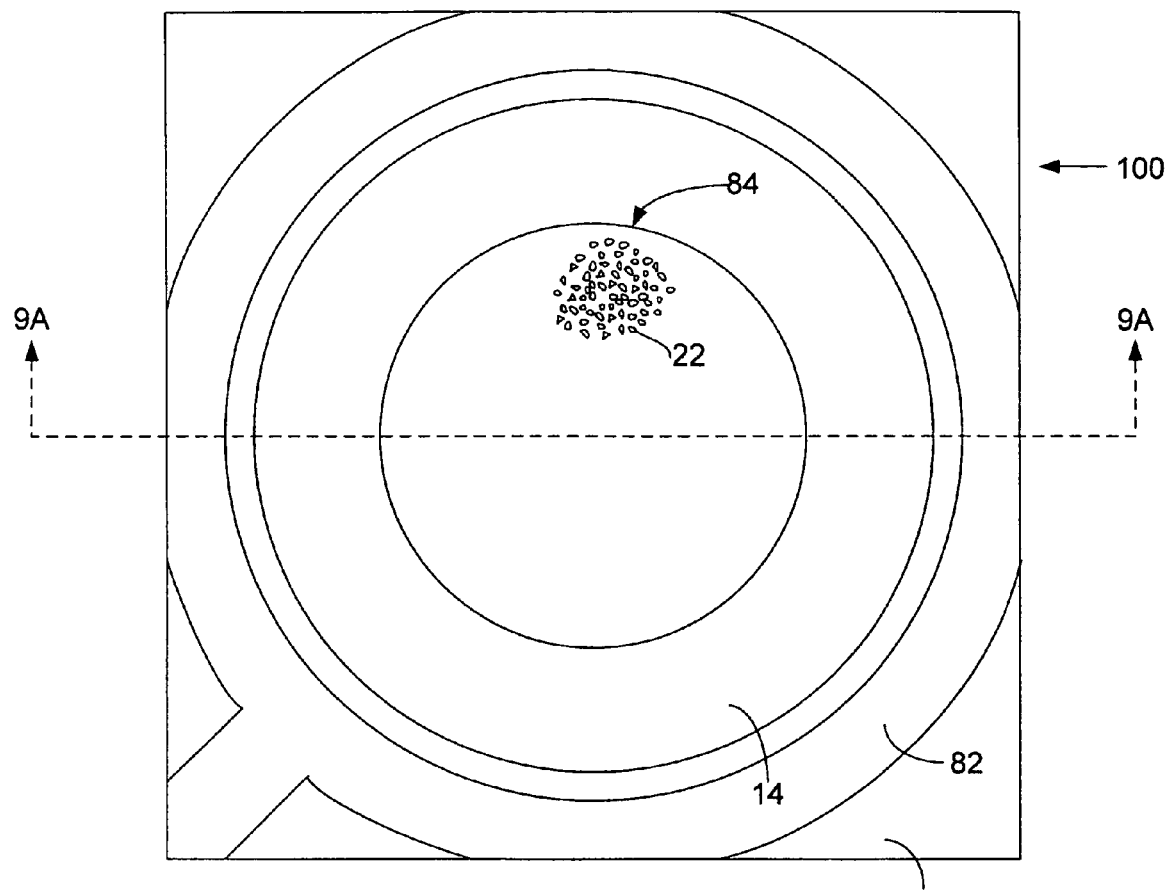
FIG. 8 is a top view of an exemplary embodiment of a dielectric light emitter with nanohole openings.

FIG. 8 is a top view of an exemplary embodiment of the light device in an integrated DLE 100 that includes an emitter area 84 within the cathode layer 14. A portion of the cathode layer 14 is shown magnified to display the nanohole openings 22. In actual practice, the nanohole openings are on average uniformly distributed over the surface of at least the emitter area 84 although they may be randomly spaced and randomly sized. The cathode layer 14 is electrically coupled to and disposed on conductive layer 82 that is disposed over insulator layer 78. Integrated DLE 100 is shown as preferably a circular shape, however other shapes can be used. The circular shape is preferable in that the electric fields generated are more uniform as there are no discrete edges within the shape to alter the electric fields.

Figure 9A:
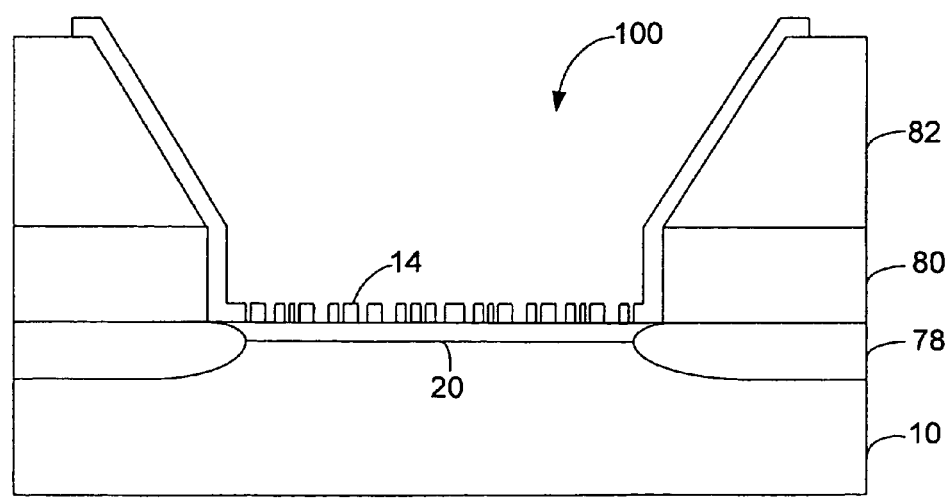
FIG. 9A is an exemplary cross-sectional view of the dielectric light emitter shown in FIG. 8.

FIG. 9A is a cross-section of the exemplary embodiment of integrated DLE 100 shown in FIG. 8 looking into the 9-9 axis. A substrate 10, preferably a conductive layer or a highly doped semiconductor provides an electron supply to tunneling layer 20 that is disposed within an opening defined within an insulator layer 78. A cathode layer 14, such as a thin-film conductive layer is disposed over the tunneling layer 20 with nanohole openings 22 (not shown to actual size which would be smaller) and partially over the conductive layer 82 thereby making electrical contact with the conductive layer. Optionally, an adhesion layer 80 can added to provide for a bonding interface between the conductive layer 82 and the insulator layer 78 depending on the particular materials chosen for insulator layer 78 and conductive layer 82. Further, cathode layer 14 optionally may be a transparent conductor such as indium tin oxide, $ZnO_x$, $SnO_2$, $In_2O_3$:Sn, to name a few. By using a transparent conductor for cathode layer 14, photons are allowed to escape without the need for nanohole openings. This transparent conductor can be applied with sufficient thickness to reduce the electron emissions while still allowing for the photon emissions to occur.

Figure 9B:
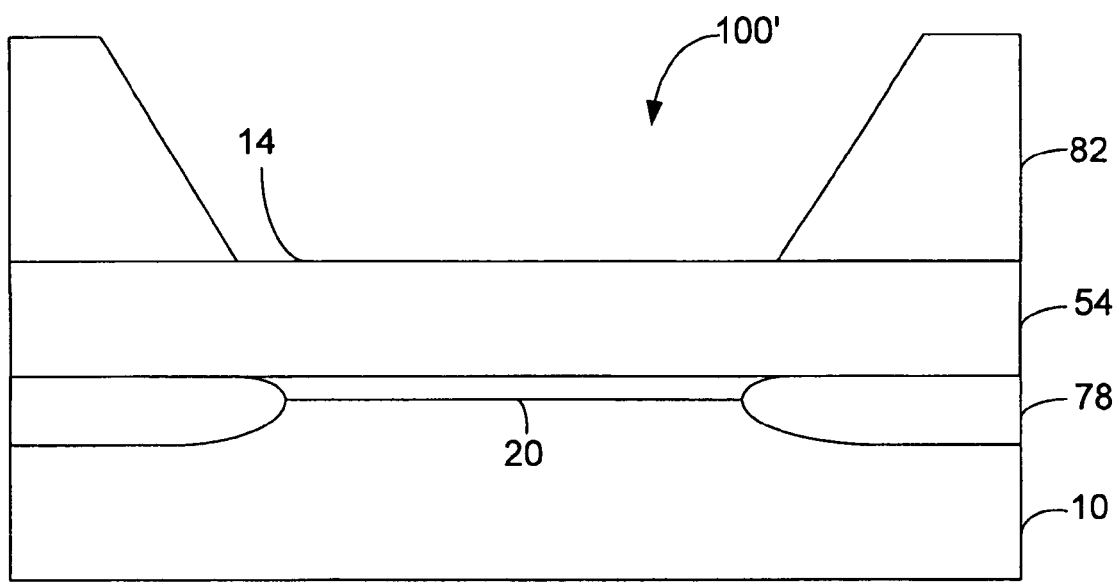
FIG. 9B is an alternative exemplary cross-sectional view of a dielectric light emitter with a transparent conductive cathode layer.

FIG. 9B is another embodiment of an integrated DLE 100' in which the conductive cathode layer 14 is made of a transparent conductor 54 that is disposed over the tunneling layer 20 and the insulating layer 78. Optionally, the conductive layer 82 is used to improve the electrical resistance of the contacts.

Figure 10A:
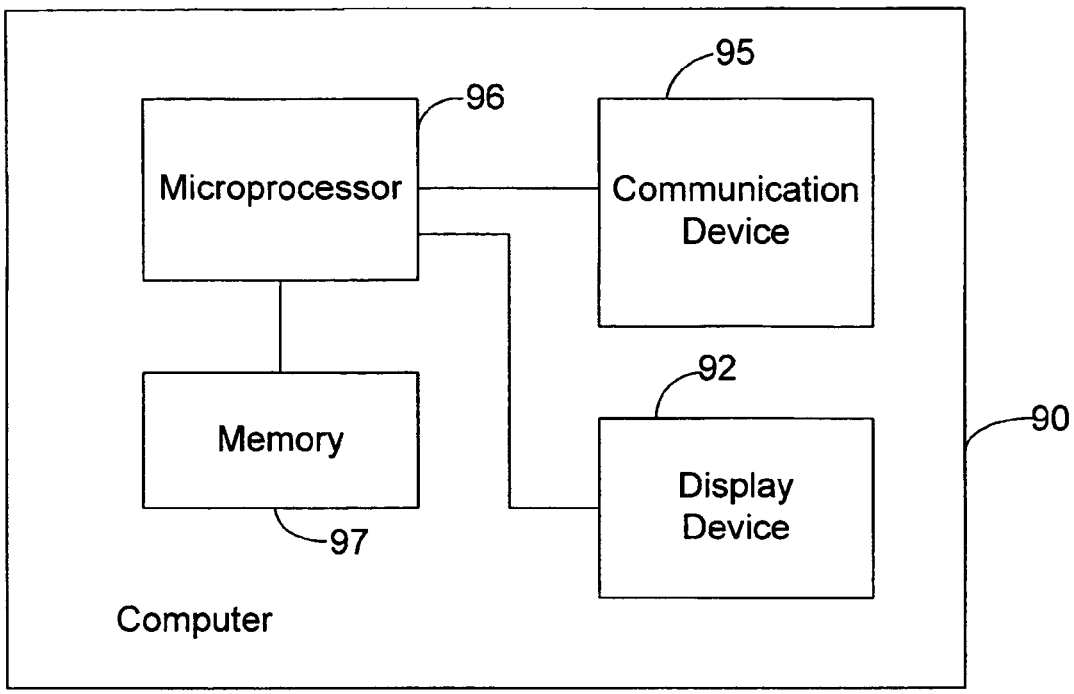
FIG. 10A is an exemplary block diagram of a computer that incorporates at least one electronic device, a display or communication device, which incorporate the dielectric light device embodiments of the light device.

FIG. 10A is an exemplary block diagram of a computer 90 that includes a microprocessor 96, memory 97, which is coupled to the microprocessor 96, and electronic devices, a communication device 95 and a display device 92. The electronic devices are coupled to the microprocessor 96. The microprocessor 96 is capable of executing instructions from the memory to allow for the transfer of data between the memory and the electronic devices, such as the communication device 95 and the display device 92. Each electronic device includes an integrated circuit that has a photon emitter incorporating the light device and optionally a focusing device for focusing the photon emissions from the emitter. The emitter has an electron supply layer with an insulating layer disposed thereon. The insulating layer has an opening defined within which a tunneling layer is formed on the electron supply layer. On the tunneling layer is a cathode layer partially transparent with nanohole-sized openings 22. Optionally, the cathode layer may be formed from a transparent conductive material. Preferably but optionally, the integrated circuit with the emitter has been subjected to an annealing process to create the nanohole openings 22 and lower the tunneling layer resistance thereby increasing the supply of electrons that can tunnel from the electron supply layer to the cathode layer and state transition to create photon emissions. The annealing process also reduces the contact resistance between metal layers thereby enhancing the conductivity of electrons to the emitter.

Figure 10B:
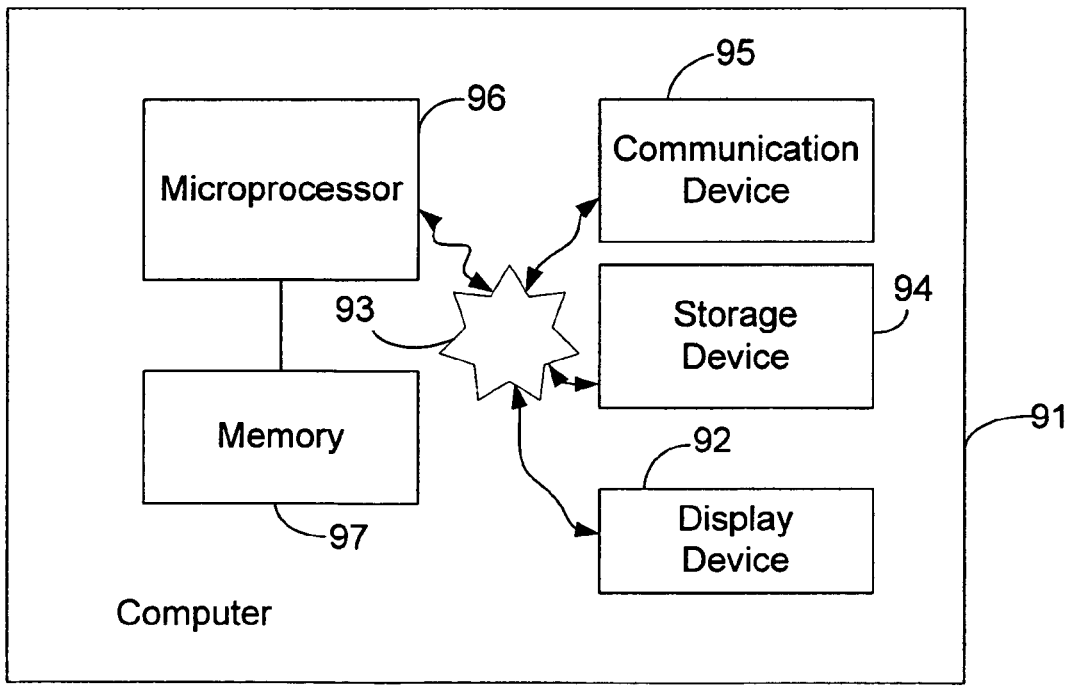
FIG. 10B is an exemplary block diagram of a computer that incorporates at least one electronic device, a display, communication or storage device, which use dielectric light devices for communication.

FIG. 10B is an alternative exemplary block diagram of a computer 91 that includes a microprocessor 96, memory 97, which is coupled to the microprocessor 96, and electronic devices, a communication device 95, a storage device 94, and a display device 92. The electronic devices are coupled to the microprocessor 96 using an optical network 93 to minimize electrical wiring and ease the assembly of the computer while allowing for high-speed communication. Preferably, the optical network uses a conventional networking protocol known to those of skill in the art. The microprocessor 96 is capable of executing instructions from the memory to allow for the transfer of data between the memory and the electronic devices, such as the communication device 95, storage device 94, and the display device 92. Each electronic device includes an integrated circuit that has a photon emitter incorporating the light device and optionally a focusing device for focusing the photon emissions from the emitter to a detector, preferably an embodiment of the light device used as a photon receiver (see discussion on FIGS. 19 and 20) but optionally a conventional photodetector. The optical network 93 could be as simple as a mirror or as complex as an optical router or switch that use the dielectric light emitters of the light device or other light emitters. The emitter has an electron supply layer with an insulating layer disposed thereon. The insulating layer has an opening defined within which a tunneling layer is formed on the electron supply layer. On the tunneling layer is a cathode layer partially transparent with nanohole-sized openings 22. Optionally, the cathode layer may be formed from a transparent conductive material. Preferably but optionally, the integrated circuit with the emitter has been subjected to an annealing process to create the nanohole openings 22 and lower the tunneling layer resistance thereby increasing the supply of electrons that can tunnel from the electron supply layer to the cathode layer and state transition to create photon emissions. The annealing process also reduces the contact resistance between metal layers thereby enhancing the conductivity of electrons to the emitter.

FIGS. 11A to 11M illustrate exemplary process steps used to create an emitter incorporating the light device. In FIG. 1A, a mask 102, of dielectrics or photoresist is applied to a substrate 10, preferably a silicon semiconductor substrate, although substrate 10 might be a conductive thin-film layer or a conductive substrate. Preferably substrate 10 has a sheet resistance of about 100 to 0.0001 ohms centimeter.

Figure 11A:
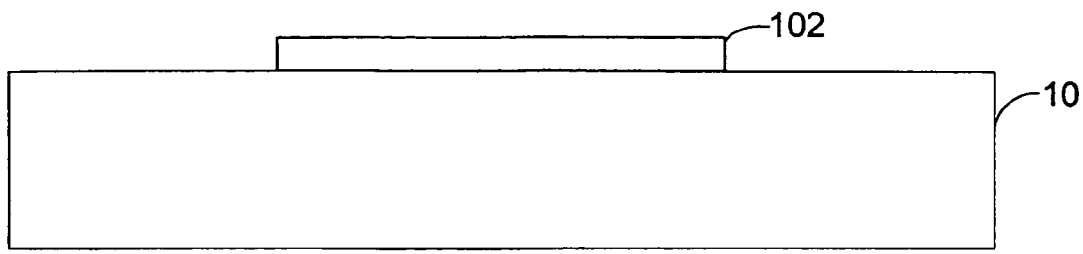
FIGS. 11A–11M are illustrations of exemplary steps used in an exemplary process to create the dielectric light device embodiments.
Figure 11B:
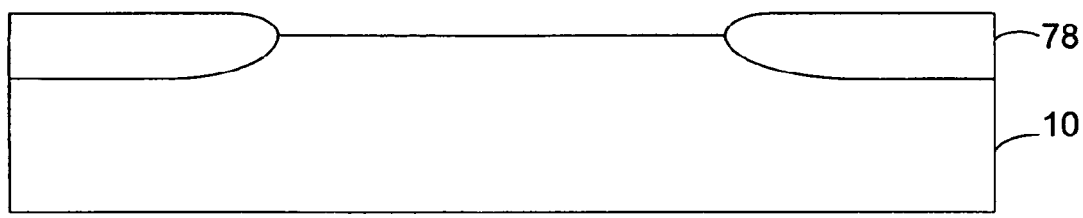

In FIG. 11B an insulator layer 78 is created, such as by field oxide growth when substrate 10 is a silicon substrate. Optionally, the insulator layer 78 can be formed of other oxide, nitride, or other conventional dielectrics deposited or grown alone or in combination using conventional semiconductor processes. The insulator layer 78 is created on substrate except in areas covered by mask 102. The area defined by mask 102, and thus the resulting voids or defined openings within insulator layer 78 determines the location and shape of the latter formed integrated DLE 100 when mask 102 is removed.

Figure 11C:
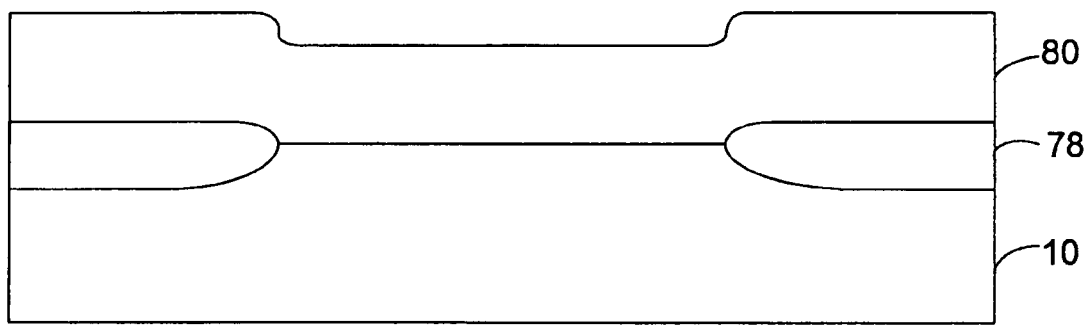

In FIG. 11C, an optional adhesive layer 80 is applied on the substrate 10 and insulator layer 78. The adhesive layer 80 is preferably tantalum when the later applied conductive layer 82 (see FIG. 11D) is made of gold. Preferably, the adhesive layer is applied using conventional deposition techniques. The adhesive layer is preferably about 100 to about 200 Angstroms thick but can be any thickness depending on the materials chosen. Optionally, a ballast layer 21 can be applied and patterned in the defined opening of insulator layer 78.

Figure 11D:
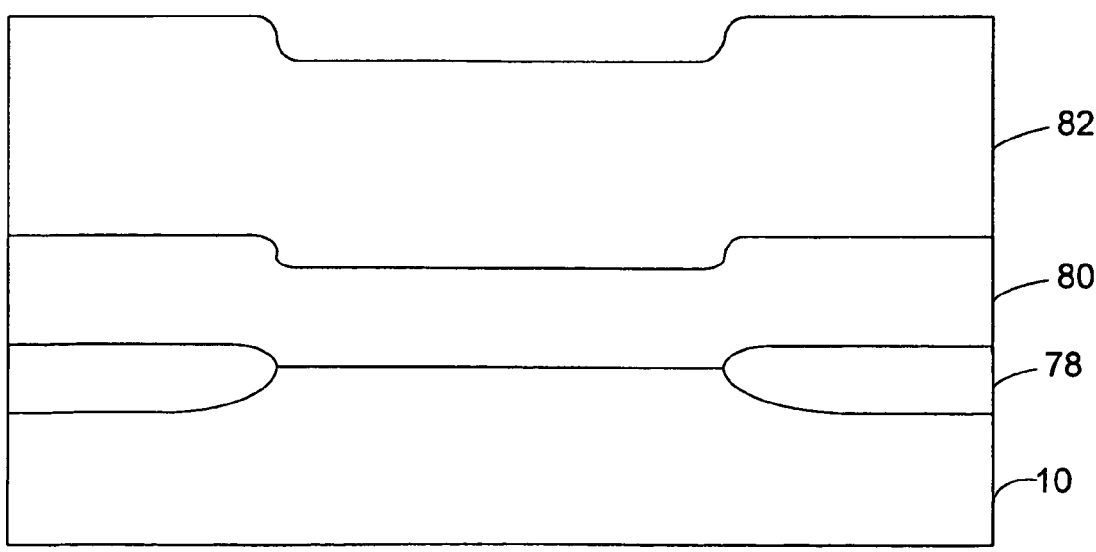

In FIG. 11D a conductive layer 82 is applied on the previously applied layers on substrate 10, such as adhesive layer 80 if used. Preferably, the conductive layer is formed using conventional deposition techniques. The conductive layer is for instance gold that is deposited to between about 500 to about 4000 Angstroms thick.

Figure 11E:
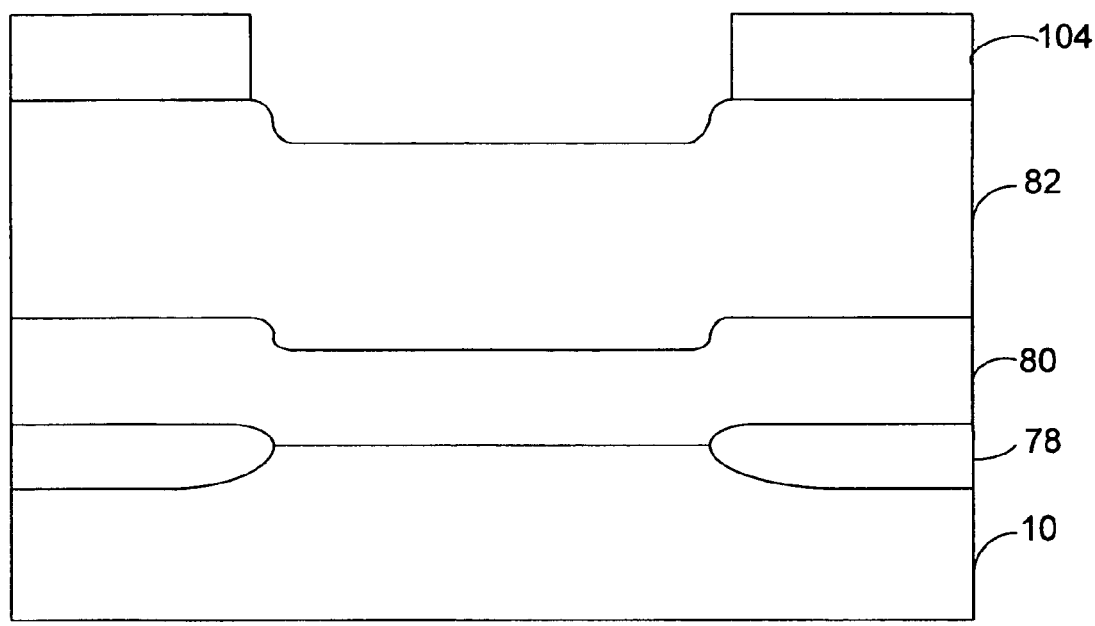

In FIG. 11E a patterning layer 104 is applied on the conductive layer 82 and an opening is formed within it to define an etching region for creating the integrated DLE. For example, the patterning layer 104 is a positive photoresist layer of about 1 um thickness.

Figure 11F:
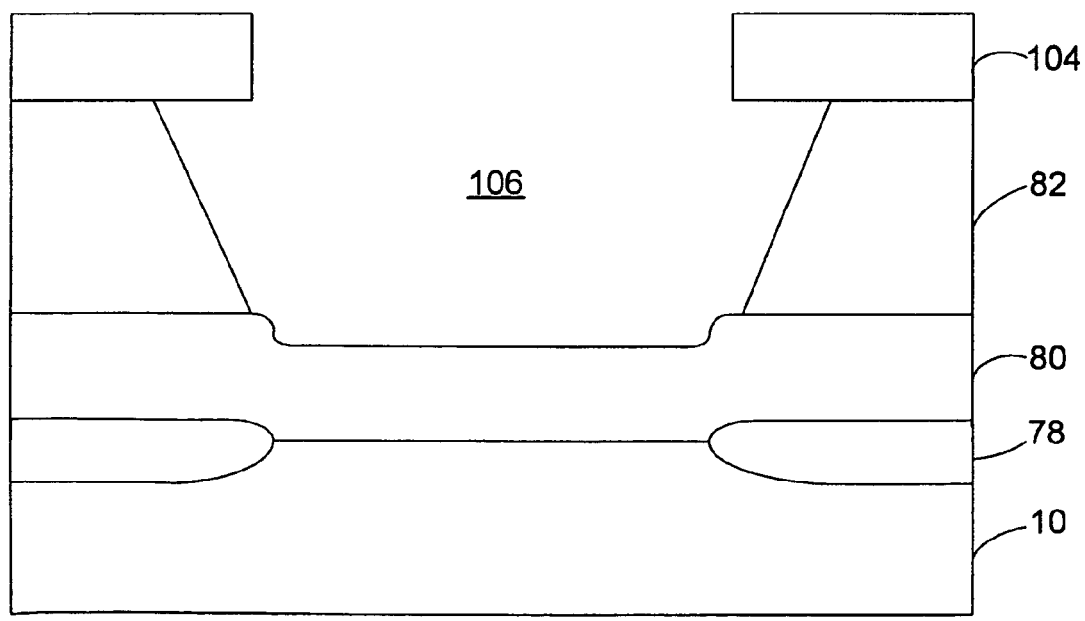

In FIG. 11F an exemplary wet etch process is used to create an opening in the conductive layer 82 within the opening of the patterning layer 104. Typically, the etching will create an isotropic etch profile 106 as shown in which a portion of the conductive layer is undercut under the patterning layer 104. Preferably the wet etch process used does not react with the adhesive layer 80, if used, to prevent the etch material from reaching the substrate 10. Optionally, a dry etch process can be used to etch the conductive layer 82.

Figure 11G:
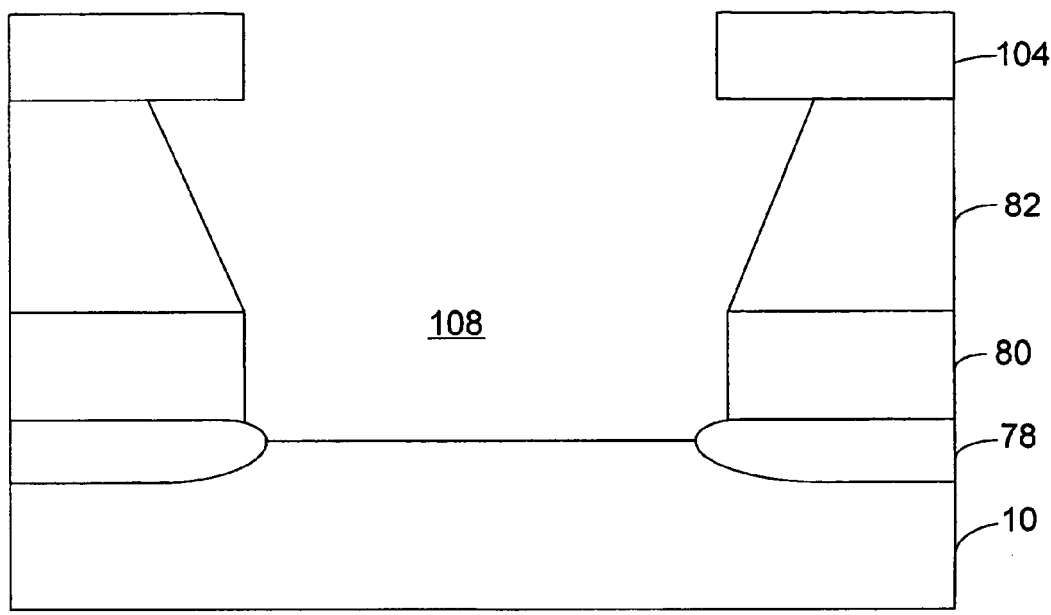

In FIG. 11G an exemplary dry etch process that is reactive to the adhesive layer 80 an essentially non-reactive to conductive layer 82 is used to create an anisotropic profile 108. If not previously applied, a ballast layer 21 (not shown) can be applied over the surface of the processed substrate and in particular in the etched opening.

Figure 11H:
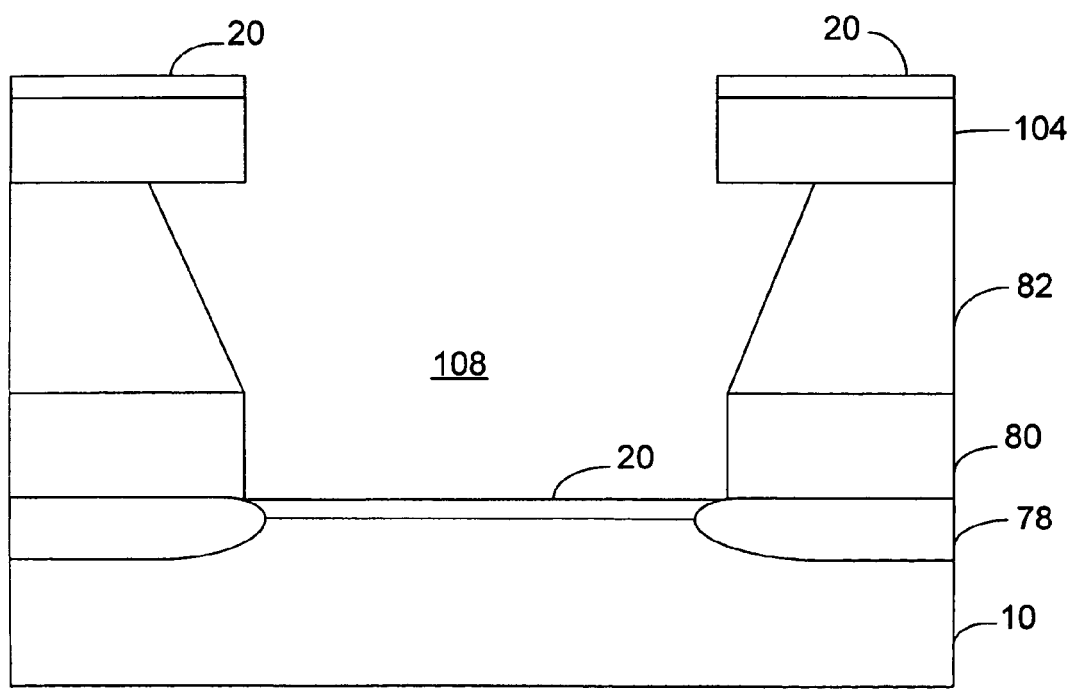

In FIG. 11H a tunneling layer 20 such as a high dielectric strength material for example, $TiO_x$, silicon rich $SiO_x$, $Si_xN_y$, $TiO_xN_y$, and $TiCO_xN_y$, is applied over the surface of the processed substrate 10 on the patterning layer 104 and openings in insulator layer 78. As discussed previously, other dielectrics can be used as well as pre-applying a ballast layer 21 (see FIG. 1). For example, a metal cluster tunneling layer 20 is deposited such as by sputtering the metal and introducing oxygen and/or nitrogen to form the dielectric to a thickness of less than about 500 Angstroms, such as between about 50 to about 250 Angstroms, for instance about 100 Angstroms.

Figure 11I:
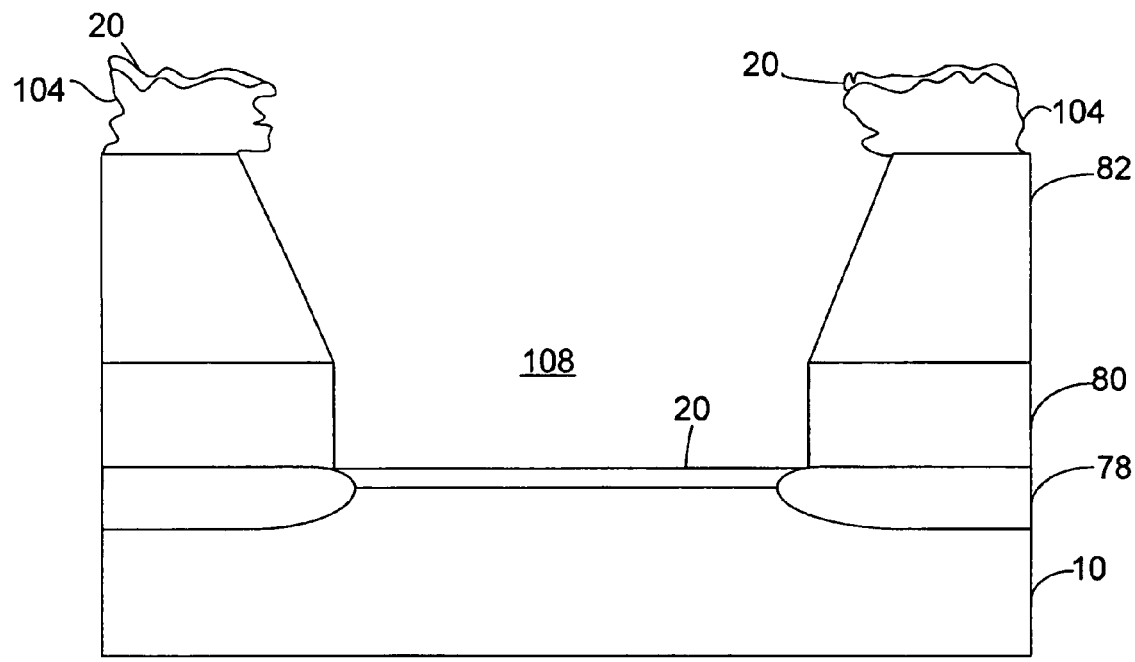

In FIG. 11I a lift-off process is used to remove patterning layer 104 and that portion of tunneling layer 20 that is disposed on the patterning layer 104. For example, low temperature plasma is used to reactively etch ash organic materials within the patterning layer 104. A gas such as oxygen is used in a planer plasma etch process. The processed substrate 10 is place in a chamber and the oxygen is introduced and excited by an energy source to create a plasma field. The plasma field energizes the oxygen to a high-energy state, which, in turn oxidizes the patterning layer 104 components to gases that are removed from the chamber by a vacuum pump. Because of their proximity and difference in volume ratios, some of the components of the patterning layer 104 during lift-off might react with constituents in the thin tunneling layer 20 disposed on the patterning layer 104. For example, carbon monoxide released from the patterning layer 104 reacts with the oxygen in a $TiO_x$ layer of tunneling layer 20 to form $CO_2$ gas which is then removed leaving a small amount of Ti on the surface of the conductive layer 82. Thus the tunneling layer 20 disposed on the patterning layer 104 is essentially removed in the lift-off process. After the lift-off process is complete, essentially only that portion of tunneling layer 20 that is disposed within the openings of insulator layer 78 remains.

Optionally, a wet lift-off process can be used in lieu of the plasma lift-off process. After the tunneling layer 20 is applied to the surface of the processed substrate 10, the substrate 10 is immersed in a solvent that will swell and remove the patterning layer 104 thus keeping the tunneling layer 20 disposed within the opening of insulator layer 78.

Figure 11J:
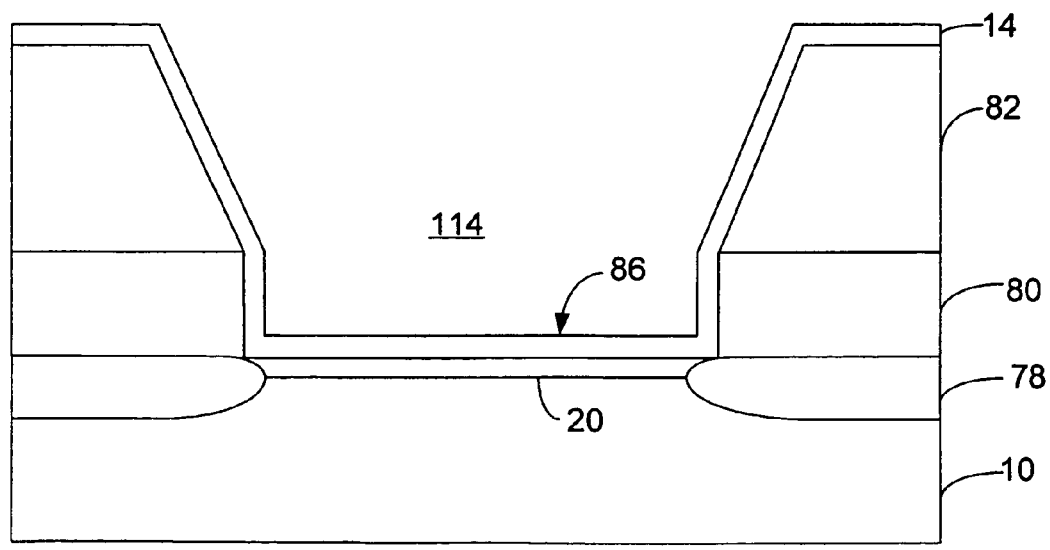

FIG. 11J shows the application of a cathode layer 14 over the surface of the processed substrate 10. The cathode layer 14 is preferably a thin-film metallic layer such as platinum and preferably has a thickness of about 50 to about 250 Angstroms. Other metals can be used for cathode layer 14 such as gold, molybdenum, iridium, ruthenium, tantalum, chromium, or other refractive metals or alloys thereof. The cathode layer 14 disposed on tunneling layer 20 forms the emitter surface 86 within the emitter chamber 114.

Figure 11K:
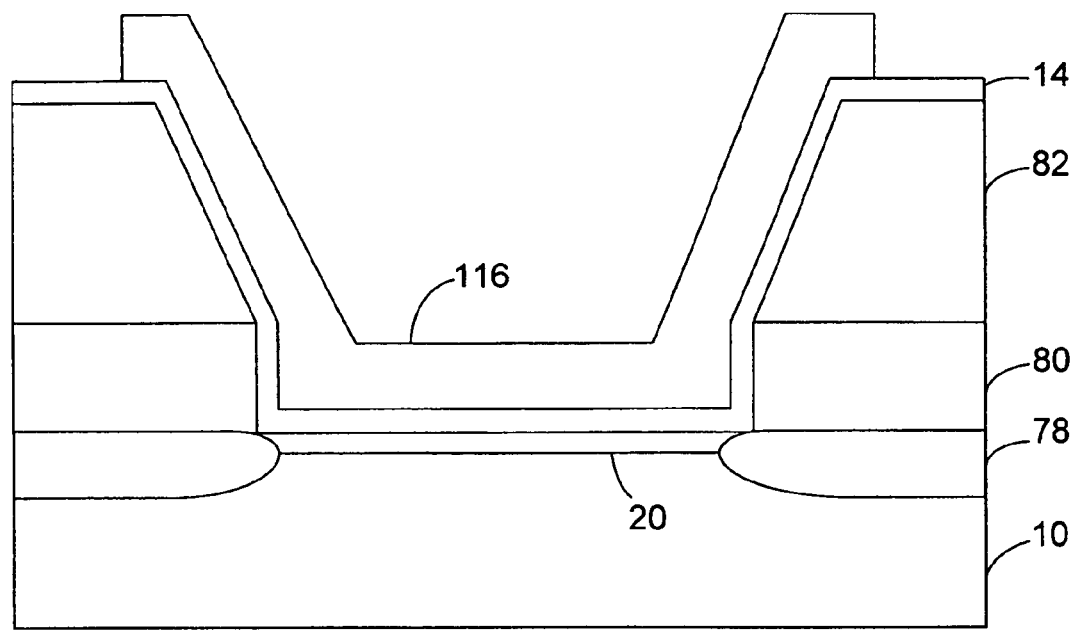

FIG. 11K illustrates the application of a cathode photoresist layer 116 that has been applied and patterned to define openings where the cathode layer 14 is to be etched to isolate multiple emitters on the substrate 10.

Figure 11L:
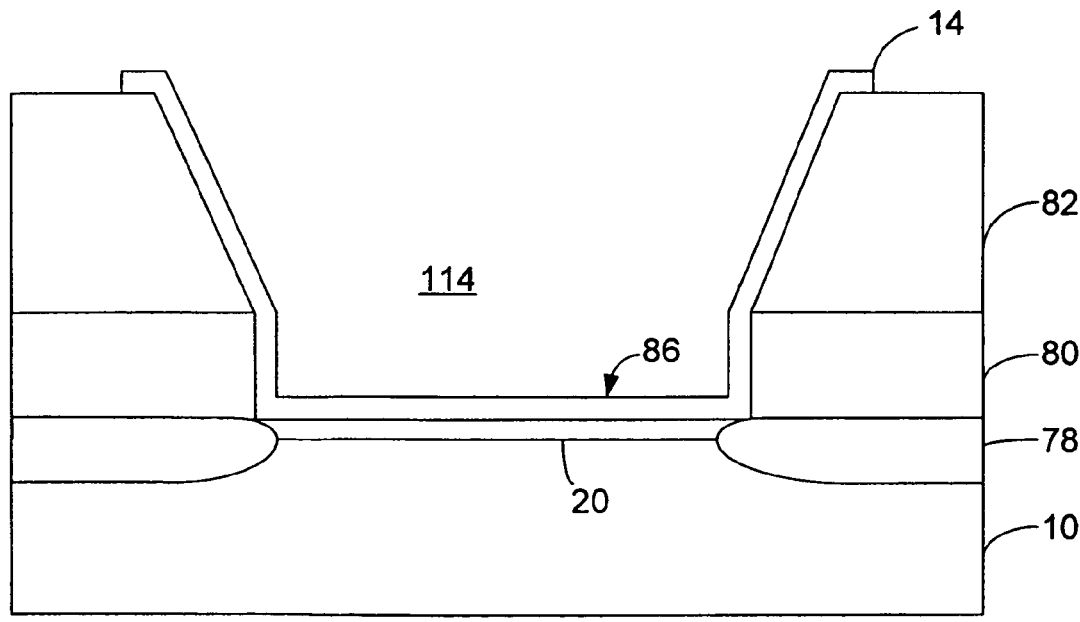

FIG. 11L illustrates the cathode layer 14 after it has been etched and the cathode photoresist 116 removed. Within the emitter chamber 114 is the emitter surface 86. An exemplary top view of the resulting structure is shown in FIG. 8. The emitter surface 86 has a first area. The emitter chamber 114 has a first chamber section interfacing to the emitter surface 86 that has substantially parallel sidewalls within the adhesion layer 80. The emitter chamber 114 has a second chamber section formed in the conductive layer 82 that has sidewalls that diverge to an opening having a second area. The second area is larger than the first area. The cathode layer 14 is disposed on the emitter surface 86 and the sidewalls of the first and second sections of the emitter chamber 114.

Figure 11M:
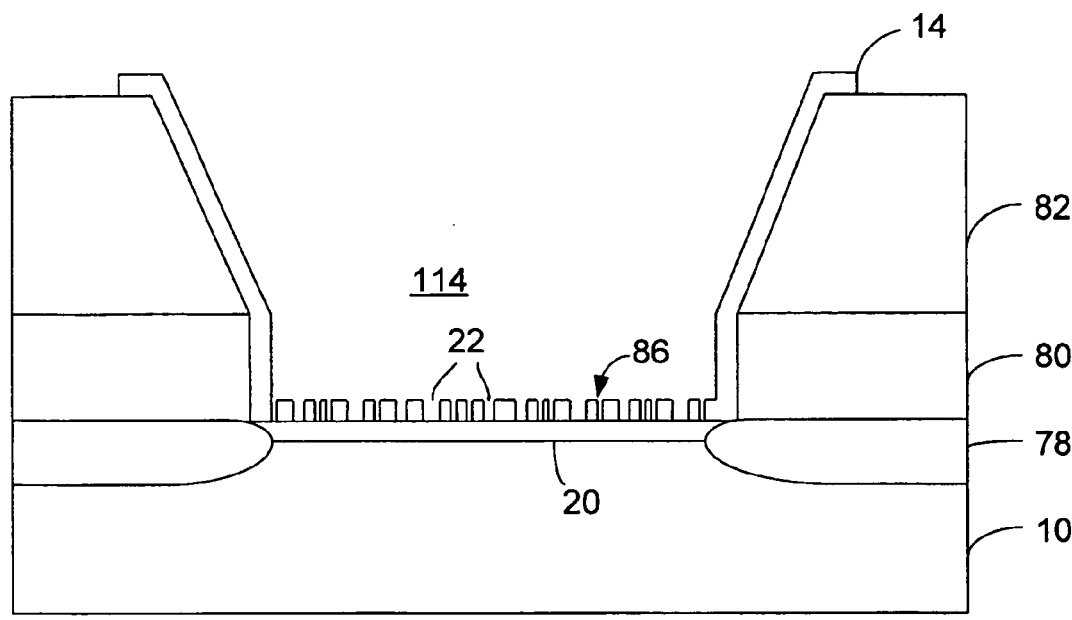

In FIG. 11M, after fabrication, the emitter is optionally subjected to an annealing process to increase the amount of photon and electron emission from the emitter by creating nanohole-sized openings 22 and reducing the tunneling resistance in the tunneling dielectric layer 20. By using integrated circuit thin film technology to fabricate the emitter, it can be integrated along with traditional active circuits found on conventional integrated circuits. The integrated circuit with the emitter can be used in display devices, communication, or storage devices as previously described.

Figure 12A:
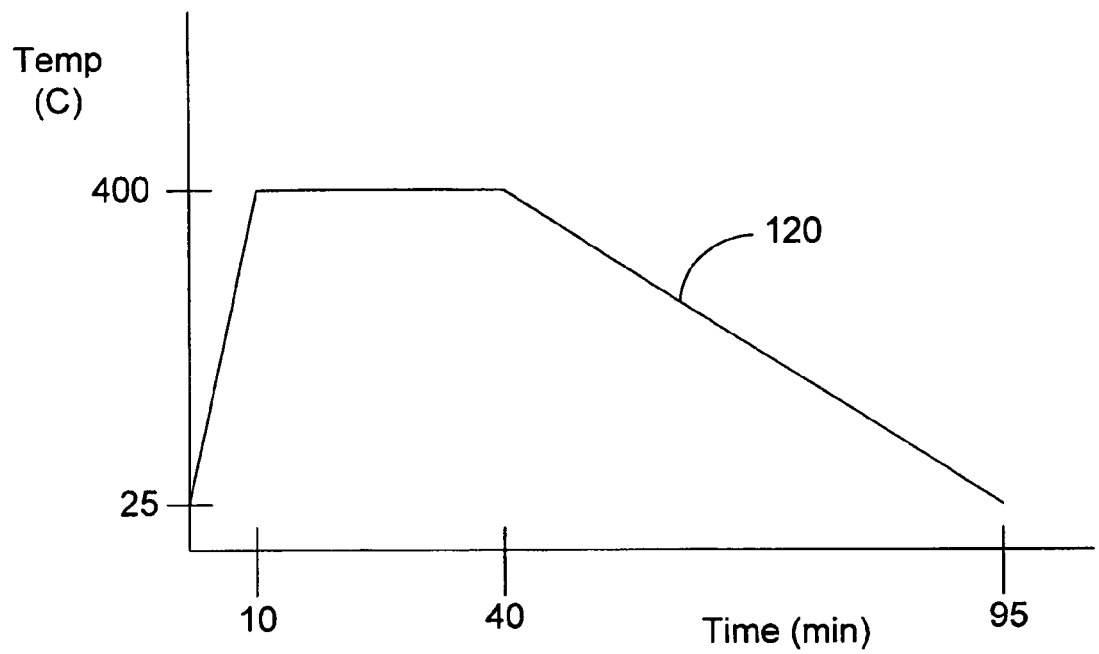
FIGS. 12A and 12B are charts of exemplary annealing processes used to optionally improve the dielectric light device embodiments.
Figure 12B:
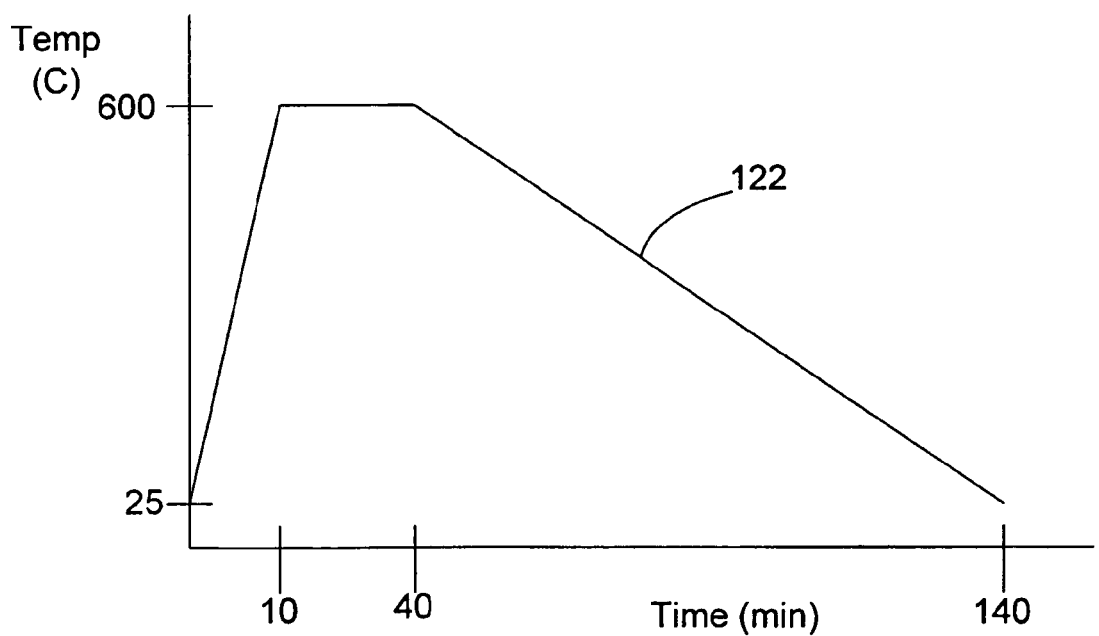

FIGS. 12A and 12B are charts of exemplary annealing processes which are used to increase the emission current capability of an emitter embodying the light device. An annealing process also increases the device yields and quality by allowing the emitters to last longer. The annealing process, among other benefits, helps to decrease the resistance of contacts of dissimilar metals thereby increasing the current flow to the emitters.

Preferably, to create nanoholes in a platinum cathode layer (but not gold), the air environment in which the annealing process occurs should contain nitrogen gas. Air has about 78% nitrogen gas by composition and annealing within an air environment will create nanoholes. An optional environment is to use substantially an environment of nitrogen gas only. Experimental testing has shown that annealing in an oxygen only or argon only atmosphere environment will not create nanohole-sized openings in the platinum. Preferably, the annealing process is performed in a rapid thermal process chamber with no vacuum rather than a tube furnace to speed up the process and to prevent any dopant used in the wafer processing from spreading throughout the processed wafer.

In FIG. 12A, a first thermal profile 120 shows the processed substrate that includes an emitter incorporating the light device first elevated to a temperature of about 400 C within 10 minutes then held at this temperature for 20 to 30 minutes. Then the processed substrate is slowly cooled back to room temperature (about 25 C) over a period of about 55 minutes.

In FIG. 12B, a second thermal profile 122 shows the processed substrate including an emitter incorporating the light device heated to a temperature of about 600 C (or optionally another level such as 650 C) within 10 minutes and held at that temperature for about 20 to 30 minutes. Then, the processed substrate is gradually cooled to room temperature over a period of about 100 minutes. Those skilled in the art will appreciate that the elevated temperature and the rate of cooling can be modified from the exemplary processes described and still meet the spirit and scope of the invention. By annealing a substrate that includes at least one emitter incorporating the light device, several characteristics of the emitter are improved, especially photon and electron emission density and uniformity across the surface of the emitter.

Figure 13:
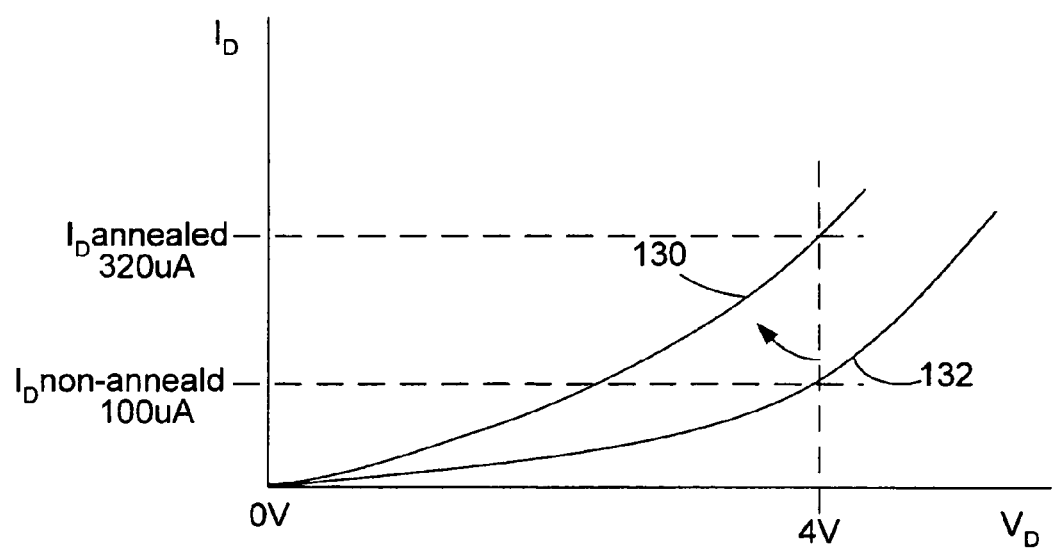
FIG. 13 is an exemplary graph showing a change in tunneling resistance due to an annealing process.

FIG. 13 is an exemplary chart showing the improvement in lower tunneling resistance attributed to the annealing process. In this example, non-annealed IV curve 132 represents the current $i_D$ measured through a non-annealed dielectric light dielectric light emitter 50 (see FIG. 2). The dielectric light dielectric light emitter 50 has a characteristic IV curve in the forward bias direction that appears exponential such as with a tunneling diode. A portion of the current through the dielectric light dielectric light emitter 50 is converted to the emitted current $i_E$ that leaves the emitter and collected by an anode 30 (see FIG. 2). In this empirical example, the current $i_D$ measured at 4 volts of applied voltage across the emitter is about 100 uA for a non-annealed emitter represented by non-annealed IV curve 132. Annealing the dielectric light emitter 50 causes the tunneling current to increase by lowering the tunneling resistance as is shown by the annealed IV curve 130, which represents the annealed emitter characteristic IV curve when biased in the forward direction. In this example, the current $i_D$ measured with an applied voltage of about 4V is about 320 uA. This change in tunneling current is on the order of over three times that of the non-annealed emitter and thus corresponds to a tunneling resistance on the order of about three times less than the non-annealed emitter. Depending on the annealed process and parameters of the process used, it is desired that the tunneling resistance be decreased by at least an order of 2 or more which is possible as indicated by the empirical results of a test emitter shown here.

Although the nanohole-sized openings in the cathode surface of exemplary embodiments increase the electronic and photonic emission current, these nanohole openings are limited in how large they can be with respect to the emitter surface in order to be practical.

Figure 14:
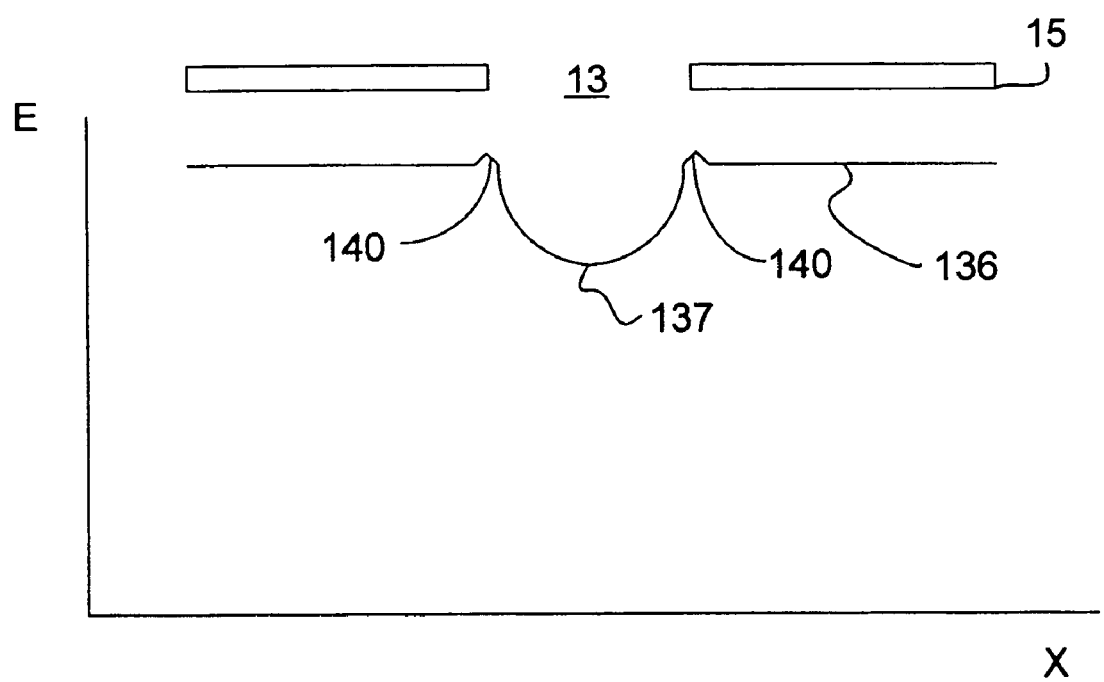
FIG. 14 is an exemplary graph of a cathode layer having an opening that is non-nano sized and its corresponding electric field across the surface of the emitter.

FIG. 14 is an exemplary chart showing the electric field strength across the surface of an emitter that has larger than nano-scale holes. In this instance an exemplary cathode layer 15 has a large opening 13 with respect to the cathode-emitting surface and dielectric layer thickness. As is shown on the plot 136 showing the electric field applied to the tunneling layer, there is a depression 137, which has a lower electric field in the region of the large opening 13. This reduction in the size of the electric field prevents many tunneled electrons from emitting through the large opening 13 and instead to emit into the cathode 15 surface that does not have openings. These electrons emitted into the cathode have more momentum than those emitted from the region within the large opening 13 and accordingly they may damage the surface of cathode 15 causing the emitter to eventually fail. Also shown on plot 136 are slight bumps 140 in which the electric field around the edge of the large opening 13 is slightly increased due to the corners in the large opening 13. Thus, around the edge of the large opening 13, the electric field is slightly enhanced.

Figure 15:
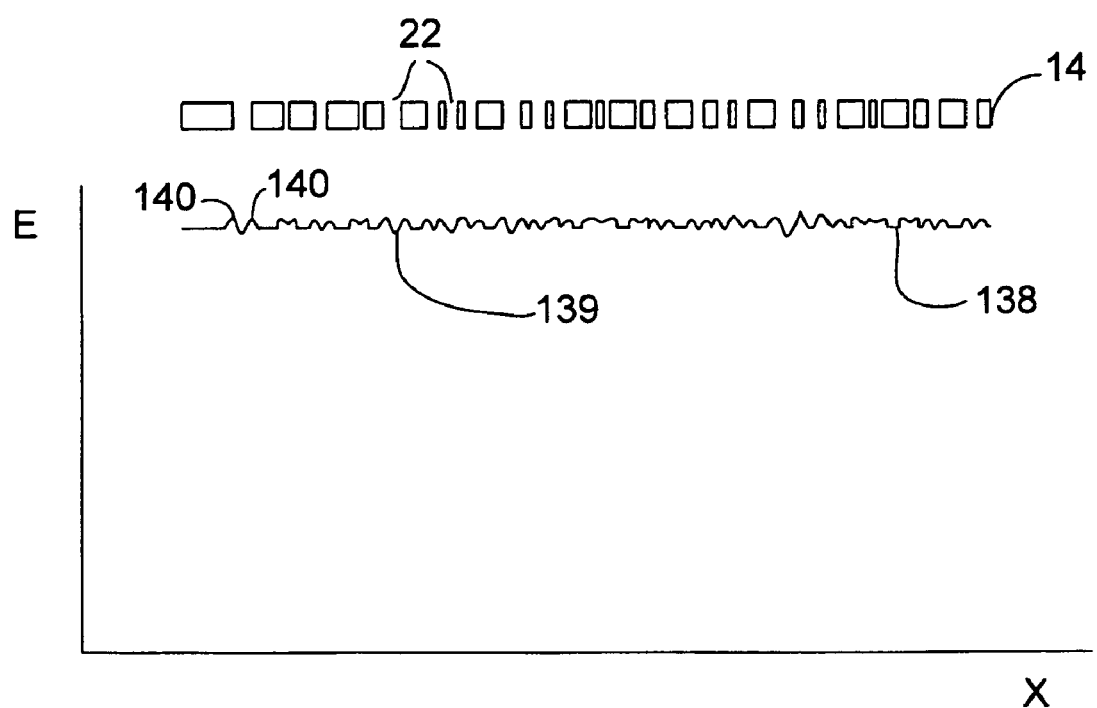
FIG. 15 is an exemplary graph of a cathode layer having nanohole-sized openings and its corresponding electric field across the surface of the emitter.

FIG. 15 is an exemplary chart showing the electric field across the surface of an emitter that has nanohole-sized openings 22. Because the nanohole-sized openings are small relative to the emitter surface of cathode 14, plot 138 shows only a slight variation 139 in the electric field strength over the surface of the tunneling layer. Also shown are the slight bumps 140 that occur around the edge of each nanohole sized opening which further increases the electric field strength. Because there are many nanohole sized opening this small increase in electric field is distributed across the surface of the emitter and thus in aggregate contributes to higher emissions.

Also important is the amount of porosity of the cathode layer. The porosity is the ratio of the total area of the openings to the total area of the cathode layer. Generally, the more porosity, the higher the emissions measured from the emitter. However, the narrowest opening must be small enough to maintain the electric field strength over the surface of the cathode layer. For example, the porosity should be greater than 25% and preferably at least 12.5%. However, generally as the size of the narrowest opening of the nanoholes increases, the maximum porosity to obtain maximum electron emissions will decrease. As the size of the narrowest opening of the nanoholes decreases, the maximum porosity to obtain maximum electron emissions will increase. As an example from empirical testing, a gold cathode layer of 75 Angstroms having cracks with a narrow openings of 7 nm and a porosity of 13% had over 6 times the electron emissions of a gold/Ta cathode layer of 30 Angstroms of Gold/15 Angstroms of Ta with 15 nm narrow openings and a porosity of 25%.

Figure 16A:
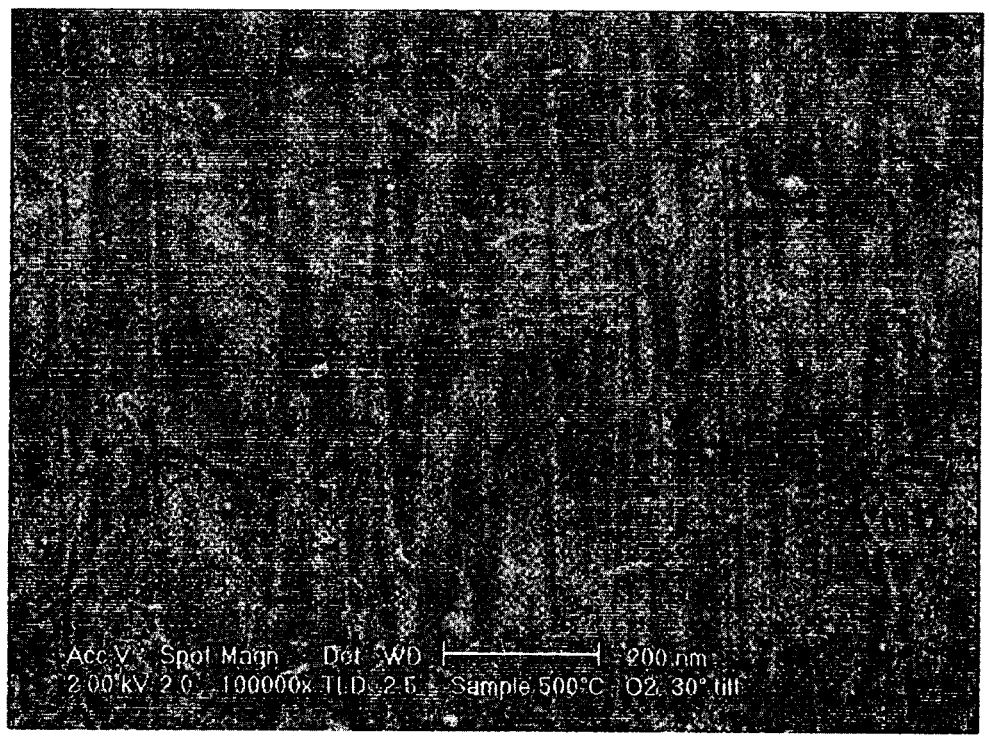
FIG. 16A is a photo of an SEM blowup of the surface of a platinum cathode layer which has been annealed in an oxygen only environment.

FIG. 16A is an exemplary scanning electron microscope magnification (10,000×) of an experimentally produced electron emitter having a platinum cathode surface that was annealed at 500 C in an oxygen only environment. No nanoholes were formed.

Figure 16B:
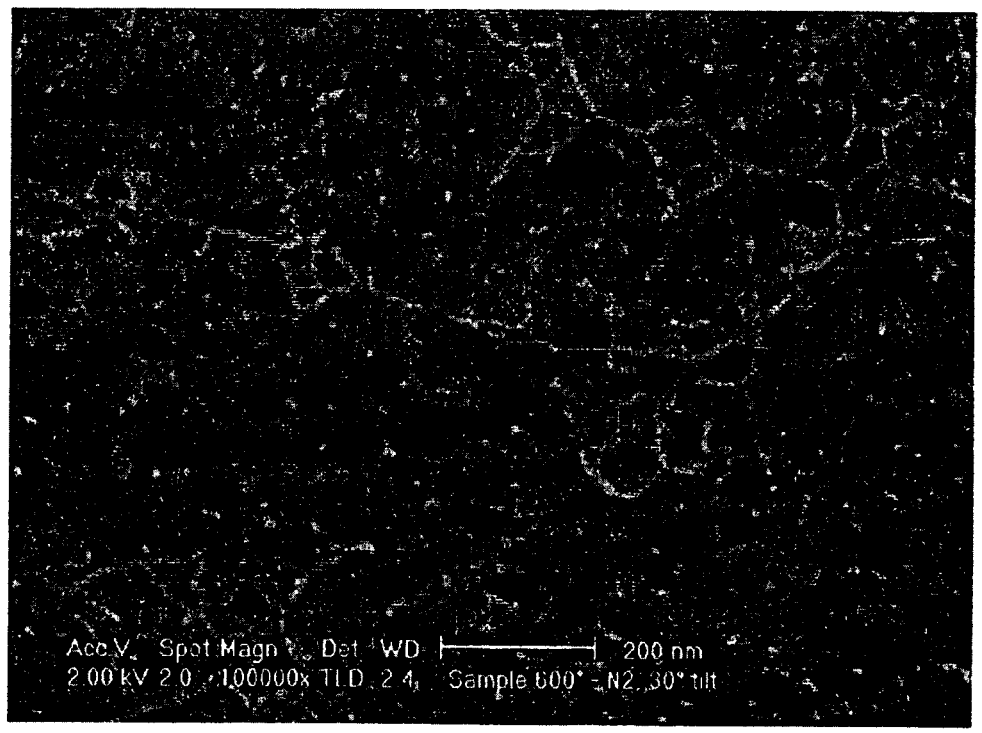
FIG. 16B is a photo of an SEM blowup of the surface of a platinum cathode layer which has been annealed in a nitrogen only environment.

FIG. 16B is an exemplary scanning electron microscope magnification (10,000×) of an experimentally produced electron emitter having a platinum cathode surface that was annealed at 600 C in a nitrogen only environment. As can be seen, the nanoholes created are substantially uniformly distributed on average but vary in size and spacing. The nanoholes appear to be on the order of about roughly 10 to 100 nanometers in diameter, although the shapes of the nanoholes are not truly circular but irregularly shaped.

Figure 17:
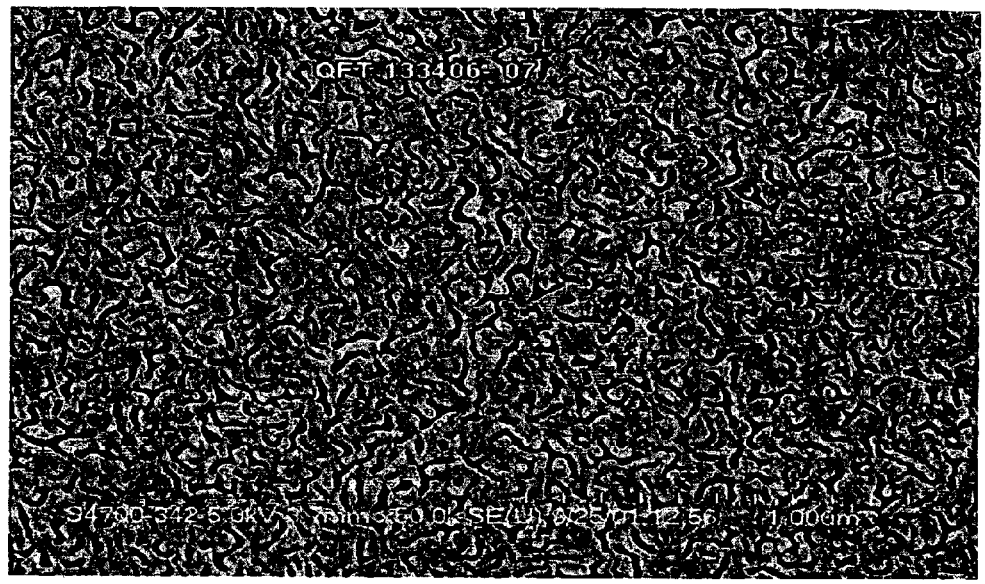
FIG. 17 is a photo of an SEM blowup of the surface of a gold cathode layer that has been subjected to an annealing process.

FIG. 17 is an exemplary scanning electron microscope magnification of a gold cathode layer having a thickness of about 75 Angstroms. Note that while the nanoholes are non-circular and appear as cracks or fissures, the nanoholes are still substantially uniformly distributed across the surface of the emitter and allow the cathode layer to maintain contiguous electrical contact across the surface of the emitter. The nanoholes in this example are randomly shaped and randomly but uniformly distanced from each other on average. The cracks or fissures have a minimum width dimension which determines the effectiveness of maintaining the electric field strength across the opening, such as about between 1 and 10 nanometers and preferably less than 10% of the thickness of the dielectric layer. The length of the crack or fissure is a longer dimension which allows for an increase in the total open area with respect to the surface area, that it its porosity. Generally a longer crack or fissure with a sufficient thin width opening will allow for more emissions. The cracks or fissures length are preferably less than 500 Angstroms but preferably between 10 and 100 Angstroms to ensure that the cathode layer while discontinuous remains contiguous electrical conductivity over the surface of the emitter.

Figure 18:
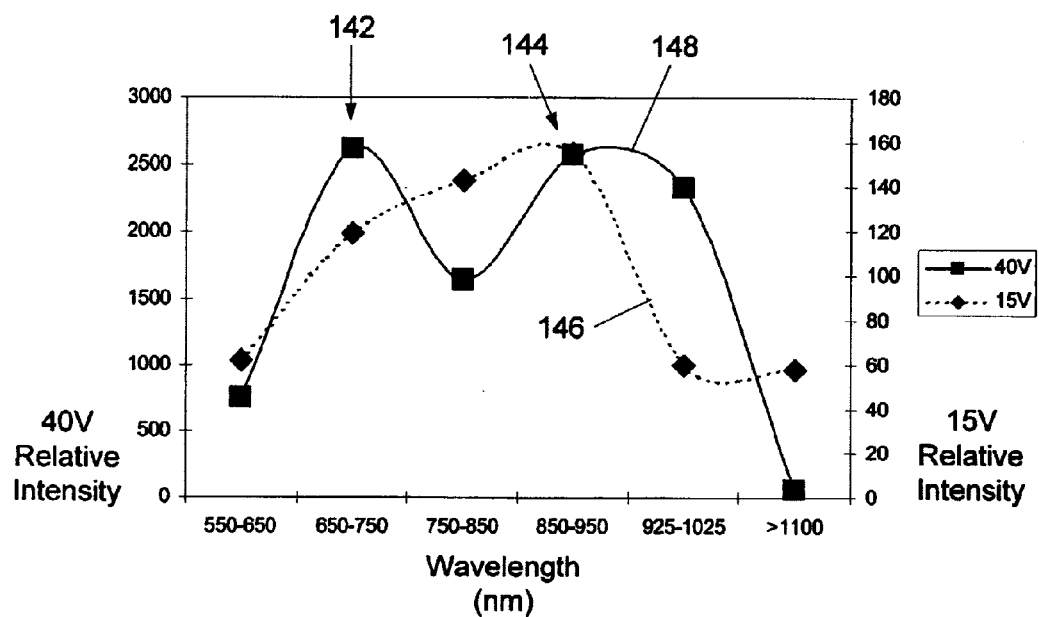
FIG. 18 is a graph of relative intensity versus wavelength for different voltages for an empirically tested embodiment of the light device.

FIG. 18 is a graph of relative intensity versus wavelength for different voltages for an empirically tested embodiment of the light device. On the left-hand scale is the intensity in relative units when 40V is applied to an embodiment the emitter. On the right-hand scale is the intensity in relative units when 15V is applied to an embodiment of the emitter. Plot 146 is the variation of intensity over wavelength for the 15V applied voltage. Note that there is a frequency peak at 144 around the 850–950 nm wavelength region although the wavelength of light emitted extends up to the 550–650 nm wavelength region. Plot 148 is the variation of intensity over wavelength for the 40V applied voltage. Note that when the voltage applied to the emitter is increased, not only is the intensity increased by over a factor of 10 but the wavelength of the light output also changes. A second peak 142 is created in the 650–750 nm region. Also, the longer wavelength regions have increased emissions. Thus, by increasing the emitter applied voltage both the intensity and breath of the wavelengths of light emitted are increased.

Figure 19:
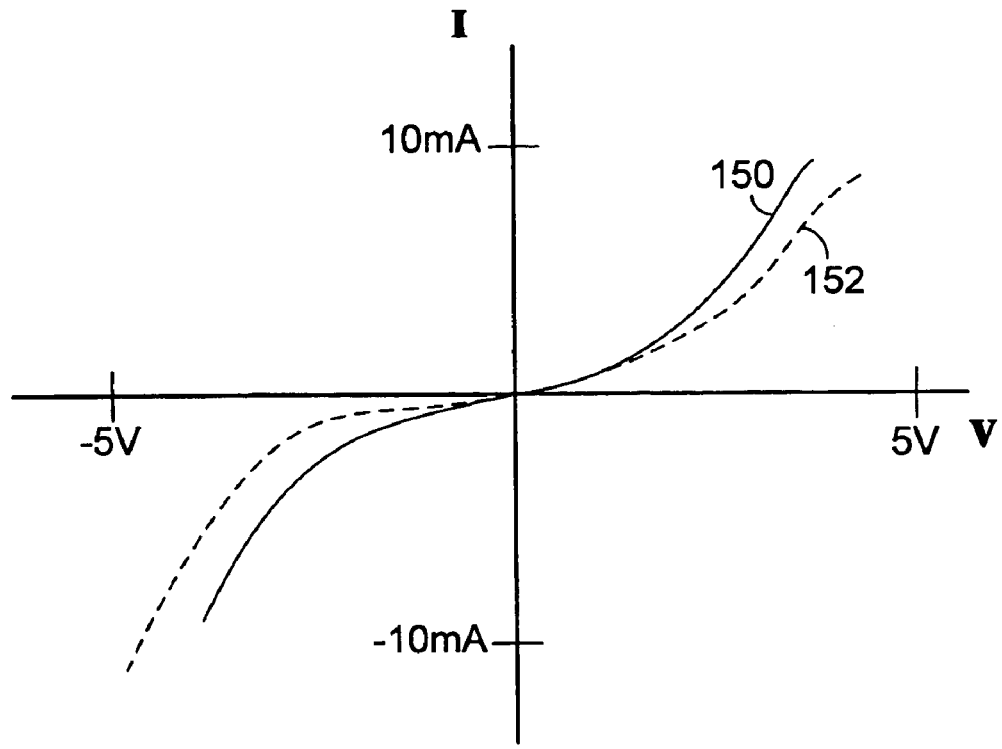
FIG. 19 is an empirically measured graph of current versus voltage for an embodiment of the light device used as a photodetector.

FIG. 19 is an empirically measured graph of current versus voltage for an embodiment of the light device used as a photodetector. In this embodiment, the electron source is a heavily doped N++ region. Without changing the structure of the light device, an electron emitter can also be used as a photon receiver (such as a photodetector). By applying a voltage on the emitter and measuring the current, the amount of current measured is an indication of the amount of photons received by the photodetector. Alternatively, a fixed current can be applied to the emitter and the voltage measured across the emitter. A change in voltage is an indication of the amount of photons received. Plot 152 is a curve of the emitter current versus applied voltage when no photons are allowed to strike the emitter surface. Plot 150 is a curve of the emitter current versus applied voltage for a given amount of photons striking the emitter surface. As can be seen, when photons strike the cathode layer emitter surface and enter the tunneling region through the at least partially transparent cathode surface the effect is to increase the forward or reverse currents for a given respective forward or reverse applied voltage. Therefore an alternative use of the emitter is as a photodetector. This versatility allows for the creation of devices on single substrate to both transmit and receive photons. Because the technology is easy to incorporate into conventional IC processing on silicon, several different applications for the emitter and photodetector exist. The function of the light device is determined by how the users configure the light device in their circuits. In fact, the light device can be used as either a transmitter, receiver, or transceiver of photons or electrons thus providing extreme capability in a single device. Various design parameters can be chosen depending on the material used for the tunneling layer, the electron source, the cathode layer and the processes used to create the devices.

Figure 20:
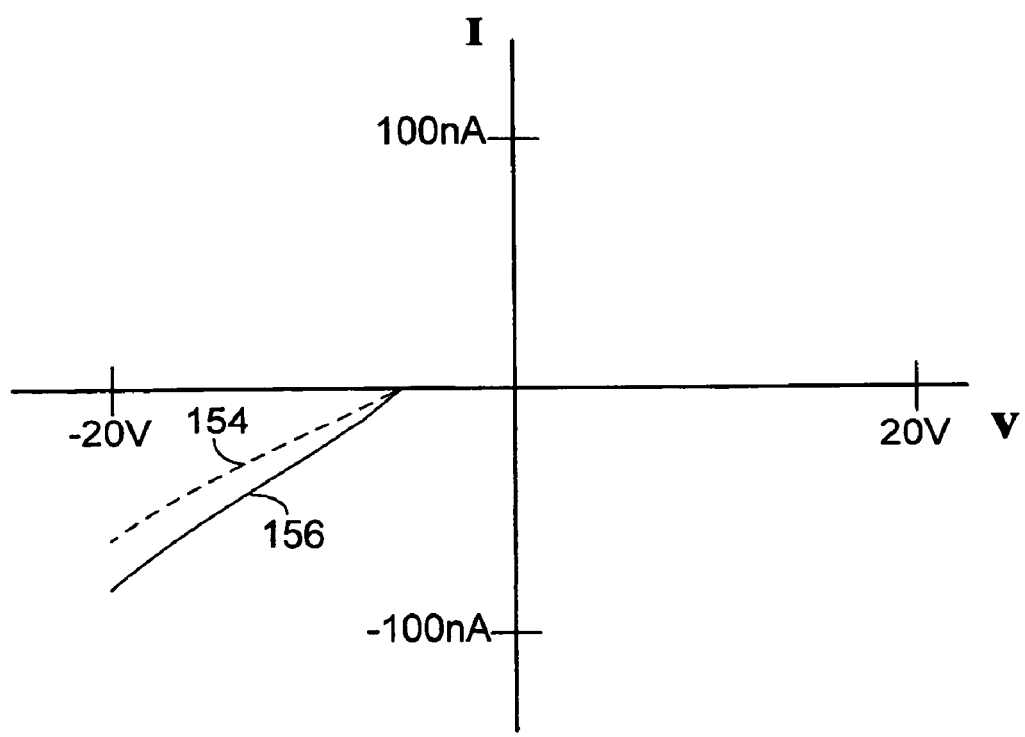
FIG. 20 is an empirically measured graph of current versus voltage for an alternative embodiment of the light device used as a photodetector in which the substrate is formed of P-type material.

For example, FIG. 20 is an empirically measured graph of current versus voltage for an alternative embodiment of the light device used as a photodetector in which the electron source is formed of P-type material. In this embodiment, the forward applied voltage does not create electron flow but the reverse applied voltage allows for electron current to flow through the emitter. Although the light emitted by a P-type electron source is less than that detected from an N-type electron source, the improved diode performance may be important in some applied uses of the light device. Plot 154 is curve of the amount of reverse current measured for an applied reverse voltage when no photons are received by the emitter surface. Plot 156 is a curve of the amount of reverse current measured for an applied reverse voltage when a given amount of photons are received on the emitter surface. For a given applied reverse voltage the increased amount of reverse current measured is proportional to the amount of photons received by the emitter surface thus allowing for photon detection.

While the present light device has been particularly shown and described with reference to the foregoing preferred and alternative embodiments, those skilled in the art will understand that many variations may be made therein without departing from the spirit and scope of the invention as defined in the following claims. This description of the light device should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

The invention claimed is:

1. A light device, comprising:
   a tunneling layer of a high field strength dielectric;
   an emitting surface having a first area defined on the tunneling layer, the emitter surface having a cathode surface having at least some area that is substantially fully transparent to photons created from electron state transitions of electrons that tunnel through the tunneling layer;
   a first chamber having substantially parallel sidewalls interfacing to the emitting surface; and
   a second chamber interfacing to the first chamber and having sidewalls diverging to an opening having a second area larger than the first area.

2. The light device of claim 1, wherein the cathode surface is disposed on the emitting surface, and sidewalls of the first and second chambers and wherein the light device has been subjected to an annealing process thereby increasing the emission capability of the light device.

3. The light device of claim 1 wherein the first chamber is formed within an adhesion layer.

4. The light device of claim 1 wherein the second chamber is formed within a conductive layer.

5. An integrated circuit comprising at least one light device of claim 1.

6. A display device comprising at least one light device of claim 1.

7. A communication device comprising at least one light device of claim 1.

8. A photodetector comprising at least one light device of claim 1.

9. An integrated circuit, comprising:
   a conductive surface to provide an electron supply;
   at least one light device formed on the electron supply including, an insulator layer having at least one opening to define the location and shape of the at least one light device, a conductive layer disposed over the insulator layer, the conductive layer having at least one opening in alignment with the at least one opening;

a tunneling layer disposed within the at least one opening of the insulator layer; and a cathode layer disposed partially over the conductive layer and over the tunneling layer, wherein the cathode layer has at least some area substantially fully transparent to photons distributed substantially uniform over the opening in the insulator layer wherein photons created from electron energy state transitions of electrons that tunnel through the tunneling layer are emitted through the cathode layer.

10. The integrated circuit of claim 9 wherein the integrated circuit has been subjected to an annealing process.

11. The integrated circuit of claim 9 wherein the integrated circuit has been subjected to an annealing process that ramps to and maintains a temperature of at least about 400 to about 650 degrees C for about 20 to 30 minutes before cooling.

12. The integrated circuit of claim 9 wherein the tunneling layer is selected from the group consisting of $TiO_x$, silicon rich $SiO_x$, $Si_xN_y$, $TiO_xN_y$, and $TiCO_xN_y$.

13. The integrated circuit of claim 9 wherein the tunneling layer has a thickness less than about 500 Angstroms.

14. The integrated circuit of claim 9 wherein the cathode layer has nanohole sized openings.

15. The integrated circuit of claim 14 wherein at least one the dimensions of the nanohole-sized openings are less than about 10% of the thickness of the tunneling layer and the nanohole-sized openings are randomly spread over the tunneling layer.

16. A method for creating a processed light device on an electron supply, comprising the steps of:

forming a high field strength dielectric tunneling layer less than 500 Angstroms; and forming a dielectric light emitter and detector using semiconductor thin-film layers on the electron supply, at least one of the thin-film layers being a film characterized as at least some area substantially transparent to photons created from electron energy state transitions of electrons that tunnel through the high is field strength dielectric tunneling layer and are emitted through the cathode layer.

17. An emitter created by the process of claim 16.

18. A photodetector created by the process of claim 16.

19. The method of claim 16 further comprising the step of annealing the processed light device to increase the tunneling current of the dielectric light device.

20. The method of claim 19 wherein the step of annealing the processed light device to increase the tunneling current of the dielectric light emitter further creates the nanohole openings in the cathode layer.

21. The method of claim 19 wherein the step of annealing the processed light device is performed in an environment containing nitrogen.

22. The method of claim 16 wherein the nanohole openings are uniformly spaced on average over the emission surface and have randomly sized openings in the at least one dimension between about 1 and about 10 nanometers.

23. The method of claim 16 wherein cathode layer is formed by applying a transparent conductive layer.

24. A method for creating a processed light device on an electron supply, comprising the steps of:

applying a conductive layer to adhere to an insulator layer disposed on the electron supply, the insulator layer defining an opening to the electron supply;

applying a patterning layer on the conductive layer;

creating an opening in the patterning and conductive layer to the electron supply;

applying a tunneling layer less than 500 Angstroms thick over the patterning layer and the opening;

etching the patterning layer to remove it from under the tunneling layer thereby removing the tunneling layer not disposed in the opening by lift-off from the conductive layer; and applying an at least partially transparent cathode layer on the tunneling layer having at least some area of substantially full photon transparency distributed substantially uniformly across the opening.

25. An emitter created by the process of claim 24.

26. A photodetector created by the process of claim 24.

27. The method of claim 24 further comprising the step of annealing the processed light device to increase the tunneling current.

28. The method of claim 27 wherein the tunneling current is increased by at least a factor of 2.

29. The method of claim 27 wherein the step of annealing the processed emitter creates nanohole-sized openings in cathode layer.

30. The method of claim 29 wherein the narrowest dimension of the nanohole-sized openings are on the order of about 1 to about 10 nanometers.

31. The method of claim 29 wherein the longest dimension of the nanohole-sized openings are on the order of about 10 to about 100 nanometers.

32. A method for creating a processed light device on an electron supply surface, the method comprising the steps of:

creating an insulator layer on the electron supply surface;

defining an emission area within the insulator layer;

applying an adhesion layer on the insulator layer;

applying a conduction layer on the adhesion layer;

applying a patterning layer on the conduction layer;

creating an opening to the conduction layer in the patterning layer;

etching the conduction layer in the opening to the adhesion layer;

etching the adhesion layer to the electron supply;

applying a tunneling layer over the patterning layer and the opening;

etching the patterning layer beneath the tunneling layer and thereby lifting off the tunneling layer except a portion adhered to the electron supply surface in the opening;

applying a cathode layer over the portion of the tunneling layer and a portion of the conduction layer;

etching the cathode layer; and creating nanohole-sized openings in the cathode layer.

33. An emitter created by the process of claim 32.

34. A photon receiver created by the process of claim 32.

35. The method of claim 32 wherein the step of creating nanohole-sized openings further comprising the step of annealing the processed light device.

36. The method of claim 32 wherein the nanohole-sized openings are on the order of less than about 10% of the thickness of the tunneling layer.

* * * * *